US010360297B2

(12) United States Patent
Otero et al.

(10) Patent No.: US 10,360,297 B2
(45) Date of Patent: Jul. 23, 2019

(54) SIMPLIFIED DATA INPUT IN ELECTRONIC DOCUMENTS

(71) Applicant: MICROSOFT TECHNOLOGY LICENSING, LLC, Redmond, WA (US)

(72) Inventors: Carlos Augusto Otero, Seattle, WA (US); John Campbell, Renton, WA (US); Uhl Albert, Kirkland, WA (US); Pablo Rochat, San Francisco, CA (US); Allison Jane Rutherford, Seattle, WA (US); Catherine Harley, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/918,891

(22) Filed: Jun. 14, 2013

(65) Prior Publication Data

US 2014/0372952 A1    Dec. 18, 2014

(51) Int. Cl.
*G06F 3/0488* (2013.01)
*G06F 17/24* (2006.01)

(52) U.S. Cl.
CPC ........ *G06F 17/246* (2013.01); *G06F 3/04883* (2013.01)

(58) Field of Classification Search
CPC ... G06F 3/04883; G06F 17/247; G06F 17/246
See application file for complete search history.

(56) References Cited

U.S. PATENT DOCUMENTS 5,040,131 A * 8/1991 Torres ................... G06F 3/0481
715/210
5,588,105 A 12/1996 Foster
(Continued)

FOREIGN PATENT DOCUMENTS

CN    1790240        6/2006
CN    1834887 A      9/2006
(Continued)

OTHER PUBLICATIONS

Gottfried, et al., "Graphical Definitions—Making Spreadsheets Visual through Direct Manipulation and Gestures", In Proceedings of IEEE Symposium on Visual Languages, Sep. 23, 1997.*
(Continued)

*Primary Examiner* — William L Bashore
*Assistant Examiner* — James T Tsai
(74) *Attorney, Agent, or Firm* — Merchant & Gould P.C.

(57) ABSTRACT

Simplified data and/or syntax entry in electronic documents is provided. Custom user interface components and selectable controls may be provided that may float on a displayed document and allow for easier data or syntax input. Electronic inking gestures may be used for entry of data and/or programming syntax in an electronic scratch pad and/or directly on top of a displayed electronic document. Gestures (e.g., screen touches) may be used for selecting document components (e.g., spreadsheet ranges) followed by an interpretation by the associated application of the user's gestures. A variety of disambiguation displays, interactions and/or hints may be provided to help a user clarify ambiguous UI selections.

15 Claims, 32 Drawing Sheets

(56) References Cited

U.S. PATENT DOCUMENTS

| | | | |
|---|---|---|---|
| 5,603,021 | A | 2/1997 | Spencer |
| 5,717,939 | A * | 2/1998 | Bricklin ............... G06F 17/211 345/173 |
| 5,805,167 | A | 9/1998 | van Cruyningen |
| 5,874,952 | A * | 2/1999 | Morgan ........................ 715/835 |
| 5,896,491 | A | 4/1999 | Englefield |
| 6,055,548 | A * | 4/2000 | Comer et al. ................ 715/212 |
| 6,157,935 | A | 12/2000 | Tran |
| 6,256,649 | B1 | 7/2001 | Mackinlay et al. |
| 6,385,662 | B1 | 5/2002 | Moon |
| 6,430,584 | B1 | 8/2002 | Comer et al. |
| 7,266,763 | B2 | 9/2007 | Peyton-Jones et al. |
| 7,415,664 | B2 | 8/2008 | Aureglia |
| 7,451,397 | B2 | 11/2008 | Weber et al. |
| 7,634,730 | B2 | 12/2009 | Weber et al. |
| 8,405,627 | B2 | 3/2013 | Karlsson |
| 8,436,821 | B1 * | 5/2013 | Plichta et al. ................ 345/173 |
| 2003/0074647 | A1 | 4/2003 | Andrew |
| 2003/0112277 | A1 | 6/2003 | Shteyn |
| 2004/0093568 | A1 * | 5/2004 | Lerner ................... G06F 17/242 715/268 |
| 2004/0103366 | A1 | 5/2004 | Peyton-Jones et al. |
| 2004/0168115 | A1 | 8/2004 | Bauernschmidt et al. |
| 2005/0044496 | A1 | 2/2005 | Kotler et al. |
| 2005/0128181 | A1 * | 6/2005 | Wang et al. .................. 345/156 |
| 2005/0188174 | A1 | 8/2005 | Guzak et al. |
| 2006/0036945 | A1 | 2/2006 | Radtke et al. |
| 2006/0069635 | A1 | 3/2006 | Ram et al. |
| 2006/0129929 | A1 | 6/2006 | Weber et al. |
| 2006/0129932 | A1 * | 6/2006 | Weber ................... G06F 17/246 715/705 |
| 2006/0132812 | A1 * | 6/2006 | Barnes .................. G06F 17/212 358/1.11 |
| 2006/0203294 | A1 | 9/2006 | Makino |
| 2006/0282818 | A1 | 12/2006 | DeSpain |
| 2006/0288267 | A1 * | 12/2006 | DeSpain ........................ 715/503 |
| 2007/0061698 | A1 | 3/2007 | Megiddo et al. |
| 2007/0233811 | A1 | 10/2007 | Rochelle et al. |
| 2007/0244672 | A1 | 10/2007 | Kjaer |
| 2008/0168341 | A1 | 7/2008 | Payette |
| 2009/0006939 | A1 * | 1/2009 | DeSpain ............... G06F 17/246 715/217 |
| 2009/0044089 | A1 | 2/2009 | Gur et al. |
| 2009/0132996 | A1 | 5/2009 | Eldridge et al. |
| 2010/0049723 | A1 | 2/2010 | Aebig et al. |
| 2010/0025163 | A1 | 3/2010 | Garcia-Molina et al. |
| 2010/0058163 | A1 | 3/2010 | Garcia-molina et al. |
| 2010/0083086 | A1 * | 4/2010 | Berger et al. ................. 715/213 |
| 2010/0122194 | A1 | 5/2010 | Rogers |
| 2011/0040390 | A1 | 2/2011 | Blevins |
| 2012/0013540 | A1 | 1/2012 | Hogan |
| 2012/0072820 | A1 * | 3/2012 | Weinman, Jr. ................ 715/219 |
| 2012/0144298 | A1 * | 6/2012 | Karlsson ....................... 715/702 |
| 2012/0162107 | A1 * | 6/2012 | Yoshizawa .................... 345/173 |
| 2012/0180002 | A1 | 7/2012 | Campbell et al. |
| 2012/0260152 | A1 * | 10/2012 | Shimizu ........................ 715/217 |
| 2013/0067306 | A1 | 3/2013 | Bhargav et al. |
| 2013/0104020 | A1 | 4/2013 | Patterson et al. |
| 2013/0145244 | A1 | 6/2013 | Rothschiller et al. |
| 2014/0015782 | A1 * | 1/2014 | Kim et al. .................... 345/173 |
| 2014/0033110 | A1 * | 1/2014 | Darden ......................... 715/773 |
| 2014/0189482 | A1 * | 7/2014 | Hill ..................... G06F 3/04883 715/212 |
| 2014/0289601 | A1 * | 9/2014 | Wang et al. .................. 715/217 |
| 2014/0337720 | A1 * | 11/2014 | Park et al. .................... 715/268 |
| 2017/0242563 | A1 | 8/2017 | Patterson et al. |

FOREIGN PATENT DOCUMENTS

| | | |
|---|---|---|
| EP | 0965932 A2 | 12/1999 |
| JP | 2000029451 | 6/1998 |
| JP | 2001173263 | 12/1999 |
| JP | 2004046657 | 7/2002 |
| WO | 2005/043406 | 5/2005 |

OTHER PUBLICATIONS

Excel 2007: Basic: Crisp Comprehensive Series (2007).*
"Apple—iWork for iOS—Numbers—Innovative Spreadsheets in Just a Few Taps", Published on: Jan. 30, 2013, Available at: https://www.apple.com/apps/iwork/numbers/, 8, pgs.
"Using Dragon with Microsoft Excel—Command Cheat Sheet", Retrieved on: Apr. 18, 2013, Available at: http://www.nuance.com/naturallySpeaking/pdf/Dragon%20for%20EXCEL%20Cheat%20Sheet.pdf, 3, pgs.
Diamond, Stephanie, "How to Choose Spreadsheet Functions with NaturallySpeaking", Retrieved on: Apr. 22, 2013, Available at: http://www.dummies.com/how-to/content/how-to-choose-spreadsheet-functions-with-naturally. navId-810228.html, 2, pgs.
Diamond, Stephanie, "Input Spreadsheet Data with NaturallySpeaking", Retrieved on: Apr. 22, 2013, Available at: http://www.dummies.com/how-to/content/input-spreadsheet-data-with-naturallyspeaking. navId-810228.html, 2, pgs.
Gottfried, et al., "Graphical Definitions—Making Spreadsheets Visual through Direct Manipulation and Gestures", In Proceedings of IEEE Symposium on Visual Languages, Sep. 23, 1997, 8 pages.
Yao, Paul, "Add Support for Digital Ink to Your Windows Applications", Published on: Dec. 2004, Available at: http://msdn.microsoft.com/en-us/magazine/cc163869.aspx, 14, pgs.
"International Search Report & Written Opinion for PCT Patent Application No. PCT/US2014/041074", dated Oct. 15, 2014, 22 Pages.
"Using the Writing Pad and Touch Keyboard in Tablet PC Input Panel", Published on : Jul. 23, 2010, Available at: http://windows.microsoft.com/en-in/windows7/using-the-writing-pad-and-touch-keyboard-in-tablet-pc-input-panel.
U.S. Appl. No. 13/280,754, filed Oct. 25, 2011 entitled "Drag and Drop Always Sum Formulas".
Matlab Simulink; "Simulink® 7: Getting Started Guide"; Copyright 2010; 81 pgs. (cited in Jul. 17, 2013 OA).
Office KB, "Table addition", 2005, published May 2005, Available at: http://www.officekb.com/Uwe/Forum.aspx/word-tables/2349/Table-addition, 5 pages.
Rose Vines, "Spreadsheeting II: Good Spreadsheet Design", published 2008, Available at: http://www.geekgirls.com/spreadsheet02.htm, 6 pages.
Splane, "Chapter Four: Introducing Excel Formulas", published 2008, Available at: http://www.cob.sjsu.edu/splane_m/excelformulas.htm, 4 pages.
International Search Report and Written Opinion dated Feb. 28, 2013 in Application No. PCT/US2012/061583, 9 pages.
Chinese Office Action and Search Report Issued in Patent Application No. 201210409069.0, dated Sep. 3, 2014, 13 Pages.
Chinese Second Office Action Received for Patent Application No. 201210409069.0, dated Apr. 29, 2015, 9 Pages.
"Second Written Opinion Issued in PCT Application No. PCT/US2014/041074", dated Jul. 22, 2015, 11 Pages.
Search Report Issued in European Patent Application No. 12843280.4, dated Jul. 30, 2015, 10 Pages.
"International Preliminary Report on Patentability Issued in PCT Application No. PCT/US2014/041074", dated Oct. 16, 2015, 11 Pages.
Chinese Third Office Action Received for Patent Application No. 201210409069.0, dated Nov. 3, 2015, 13 Pages.
U.S. Official Action dated Jul. 17, 2013 cited in U.S. Appl. No. 13/280,754, 25 pgs.
U.S. Official Action dated Apr. 1, 2014 cited in U.S. Appl. No. 13/280,754, 22 pgs.
U.S. Official Action dated Jul. 7, 2015 cited in U.S. Appl. No. 13/280,754, 21 pgs.
U.S. Official Action dated Feb. 25, 2016 cited in U.S. Appl. No. 13/280,754, 32 pgs.
Chinese Office Action in 201210409069.0, dated May 3, 2016, 10 pages.
U.S. Appl. No. 13/280,754, Notice of Allowance dated Oct. 24, 2016, 12 pages.
Japenese Notice of Allowance in Application 2014538907, dated Oct. 3, 2016, 4 pages.

(56) References Cited

OTHER PUBLICATIONS

"Office Action and Search Report Issued in Chinese Application No. 201480045374.3", dated May 11, 2017, 13 Pages.
"Office Action Issued in European Patent Application No. 14736151.3", dated May 8, 2017, 7 Pages.
Chinese Notification of Reexamination in Application 201210409069.0, dated Feb. 3, 2017, 6 pgs.
U.S. Appl. No. 13/280,754, USPTO Response dated Dec. 23, 2016, 3 pages.
U.S. Appl. No. 13/280,754, USPTO Response dated Dec. 9, 2016, 2 pages.
Anonymous, "Aug. 13, 2014 Using the writing pad and touch keyboard in Tablet PC Input Panel", Web Archive Webpage, Jun. 4, 2013, pp. 1-4, retrieved from the internet at: http://web.archive.org/web/20130604014640/http://windows.microsoft.com/en-us/windows7/using-the-writing-pad-and-touch-keyboard-in-tablet-pc-input-panel (retrieved in Aug. 13, 2014).
European Office Action Issued in European Patent Application No. 12843280.4, dated Nov. 28, 2017, 8 Pages.
Chinese Decision on Reexamination in Application 201210409069.0, dated Jun. 29, 2017, 14 pgs.
"Non Final Office Action Issued in U.S. Appl. No. 15/451,168", dated Jul. 5, 2018, 23 Pages.
"Second Office Action Issued in Chinese Patent Application No. 201480045374.3", dated Apr. 16, 2018, 12 Pages.
"Final Office Action Issued in U.S. Appl. No. 15/451,168", dated Nov. 5, 2018, 18 Pages.
"Third Office Action Issued in Chinese Patent Application No. 201480045374.3", dated Dec. 6, 2018, 9 Pages.
"Calculate a Range Automatically: Range Formula Microsoft Office Excel 2007 Tutorial", Retrieved from: https://web.archive.org/web/20100329142311/http:/www.java2s.com/Tutorial/Microsoft-Office-Excel-2007/0120_Formula/CalculateaRangeAutomatically.htm, Mar. 29, 2010, 2 Pages.
"Office Action Issued in European Patent Application No. 12843280.4", dated Feb. 18, 2019, 8 Pages.
Jelen, Bill, "Subtotal tricks", Retrieved from: https://sfmagazine.com/wp-content/uploads/sfarchive/2008/05/EXCEL-Subtotal-tricks.pdf, May 1, 2008, 3 Pages.
"Notice of Allowance Issued in U.S. Appl. No. 15/451,168", dated Apr. 10, 2019, 11 Pages.
"Office Action Issued in European Patent Application No. 147361513", dated May 27, 2019, 9 Pages.

* cited by examiner

|   | A | B | C | D |
|---|---|---|---|---|
| 1 | ITEM | QUANTITY | COST | TOTAL |
| 2 | MILK | 2 GAL. | 2.65 | 5.30 |
| 3 | EGGS | 4 DOZ. | 1.99 | 7.96 |
| 4 | LIGHT BULBS | 1 | 3.50 | 3.50 |
| 5 | BEER | 1 CASE | 28.00 | 28.00 |

FIG. 2

|   | A | B | C | D | E |
|---|---|---|---|---|---|
| 1 | ITEM | QUANTITY | COST | TOTAL | |
| 2 | MILK | 2 GAL. | 2.65 | 5.30 | |
| 3 | EGGS | 4 DOZ. | 1.99 | 7.96 | |
| 4 | LIGHT BULBS | 1 | 3.50 | 3.50 | |
| 5 | SODA | 1 CASE | 28.00 | 28.00 | |

| SUM 44.76 | AVERAGE 11.19 | MAX 28.00 |
|---|---|---|
| COUNT 4 | MIN 3.5 | NUM CNT 4 |

|   | A | B | C | D |
|---|---|---|---|---|
| 1 | ITEM | QUANTITY | COST | TOTAL |
| 2 | MILK | 2 GAL. | 2.65 | 5.30 |
| 3 | EGGS | 4 DOZ. | 1.99 | 7.96 |
| 4 | LIGHT BULBS | 1 | 3.50 | 3.50 |
| 5 | BEER | 1 CASE | 28.00 | 28.00 |

FIG. 4

|   | A | B | C | D |
|---|---|---|---|---|
| 1 | ITEM | QUANTITY | COST | TOTAL |
| 2 | MILK | 2 GAL. | 2.65 | 5.30 |
| 3 | EGGS | 4 DOZ. | 1.99 | 7.96 |
| 4 | LIGHT BULBS | 1 | 3.50 | 3.50 |
| 5 | BEER | 1 CASE | 28.00 | 28.00 |

FIG. 5

|   | A | B | C | D | E | F | G | H | I | J | K | L | M |
|---|---|---|---|---|---|---|---|---|---|---|---|---|---|
| 1 | ITEM | QUANTITY | COST | TOTAL | | | | | | | | | |
| 2 | MILK | 2 GAL. | 2.65 | 5.30 | | | | | | | | | |
| 3 | EGGS | 4 DOZ. | 1.99 | 7.96 | | | | | | | | | |
| 4 | LIGHT BULBS | 1 | 3.50 | 3.50 | | | | | | | | | |
| 5 | BEER | 1 CASE | 28.00 | 28.00 | | | | | | | | | |
| 6 | | | | | | | | | | | | | |
| 7 | | | | | | | | | | | | | |
| 8 | | | | | | | | | | | | | |
| 9 | | | | | | | | | | | | | |
| 10 | | | | | | | | | | | | | |
| 11 | | | | | | | | | | | | | |
| 12 | | | | | | | | | | | | | |
| 13 | | | | | | | | | | | | | |
| 14 | | | | | | | | | | | | | |
| 15 | | | | | | | | | | | | | |

610

615
620
625
630

SUM(D2,D5)

|   | A | B | C | D |
|---|---|---|---|---|
| 1 | ITEM | QUANTITY | COST | TOTAL |
| 2 | MILK | 2 GAL. | 2.65 | 5.30 |
| 3 | EGGS | 4 DOZ. | 1.99 | 7.96 |
| 4 | LIGHT BULBS | 1 | 3.50 | 3.50 |
| 5 | BEER | 1 CASE | 28.00 | 28.00 |
| 6 |   |   |   | 44.76 |

FIG. 7

|   | A | B | C | D |
|---|---|---|---|---|
| 1 | ITEM | QUANTITY | COST | TOTAL |
| 2 | MILK | 2 GAL. | 2.65 | 5.30 |
| 3 | EGGS | 4 DOZ. | 1.99 | 7.96 |
| 4 | LIGHT BULBS | 1 | 3.50 | 3.50 |
| 5 | BEER | 1 CASE | 28.00 | 28.00 |
| 6 |  |  |  | 44.76 |

FIG. 9

|   | A | B | C | D | E | F | G | H | I | J | K |
|---|---|---|---|---|---|---|---|---|---|---|---|
| 1 | ITEM | AMOUNT | | | | | | | | | |
| 2 | ROOM RENTAL | $800 | | | | | | | | | |
| 3 | TEE SHIRTS | $120 | | | | | | | | | |
| 4 | RED SQUARE TABLE SUPPLIES | $150 | | | | | | | | | |
| 5 | CELL PHONE | $45 | | | | | | | | | |
| 6 | PRINTING AND COPIES | $200 | | | | | | | | | |
| 7 | BOOKS | $300 | | | | | | | | | |
| 8 | MISCELLANEOUS | $300 | | | | | | | | | |
| 9 | MONTHLY MOVIE NIGHT | $75 | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |

FIG. 13

|   | A | B | C | D | E | F | G | H | I | J | K |
|---|---|---|---|---|---|---|---|---|---|---|---|
| 1 | ITEM | AMOUNT | | | | | | | | | |
| 2 | ROOM RENTAL | $800 | | | | | | | | | |
| 3 | TEE SHIRTS | $120 | | | | | | | | | |
| 4 | RED SQUARE TABLE SUPPLIES | $150 | | | | | | | | | |
| 5 | CELL PHONE | $45 | | | | | | | | | |
| 6 | PRINTING AND COPIES | $200 | | | | | | | | | |
| 7 | BOOKS | $300 | | | | | | | | | |
| 8 | MISCELLANEOUS | $300 | | | | | | | | | |
| 9 | MONTHLY MOVIE NIGHT | $75 | | | | | | | | | |
| 10 | | $1,990 | | SUM ▭▭▭ | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |

FIG. 14

|   | A | B | C | D | E | F | G | H | I | J | K |
|---|---|---|---|---|---|---|---|---|---|---|---|
| 1 | ITEM | AMOUNT | | | | | | | | | |
| 2 | ROOM RENTAL | $800 | | | | | | | | | |
| 3 | TEE SHIRTS | $120 | | | | | | | | | |
| 4 | RED SQUARE TABLE SUPPLIES | $150 | | | | | | | | | |
| 5 | CELL PHONE | $45 | | | | | | | | | |
| 6 | PRINTING AND COPIES | $200 | | | | | | | | | |
| 7 | BOOKS | $300 | | | | | | | | | |
| 8 | MISCELLANEOUS | $300 | | | | | | | | | |
| 9 | MONTHLY MOVIE NIGHT | $75 | | | | | | | | | |
| 10 | SUM | $1,990 | | SUM ▫▫▫ | | | | | | | |
| 11 | | | | | ☐ SUM | | $1,990 | | | | |
| 12 | SUM | | | | AVERAGE | | $249 | | | | |
| 13 | | | | | COUNT NUMBERS | | 8 | | | | |
| 14 | | | | | MIN | | $45 | | | | |
| 15 | | | | | MAX | | $800 | | | | |
| 16 | | | | | OTHER | | | | | | |

FIG. 15

|   | A | B | C | D | E | F | G | H | I | J |
|---|---|---|---|---|---|---|---|---|---|---|
| 1 | ITEM | AMOUNT |  | CATEGORY | AMOUNT |  |  |  |  |  |
| 2 | ROOM RENTAL | $800 |  | OFFICE SUPPLIES | $500 |  |  |  |  |  |
| 3 | TEE SHIRTS | $120 |  |  |  |  |  |  |  |  |
| 4 | RED SQUARE TABLE SUPPLIES | $150 |  |  |  |  |  |  |  |  |
| 5 | CELL PHONE | $45 |  |  |  |  |  |  |  |  |
| 6 | PRINTING AND COPIES | $200 |  |  |  |  |  |  |  |  |
| 7 | BOOKS | $300 |  |  |  |  |  |  |  |  |
| 8 | MISCELLANEOUS | $300 |  |  |  |  |  |  |  |  |
| 9 | MONTHLY MOVIE NIGHT | $75 |  |  |  |  |  |  |  |  |
| 10 |  |  |  |  |  |  |  |  |  |  |
| 11 |  |  |  |  |  |  |  |  |  |  |
| 12 |  |  |  |  |  |  |  |  |  |  |
| 13 |  |  |  |  |  |  |  |  |  |  |
| 14 |  |  |  |  |  |  |  |  |  |  |
| 15 |  |  |  |  |  |  |  |  |  |  |
| 16 | AVERAGE $249 |  |  | SUM $1,990 |  |  | COUNT 8 |  |  |  |

FIG. 22

|   | A | B | C | D | E | F | G | H | I | J |
|---|---|---|---|---|---|---|---|---|---|---|
| 1 | ITEM | AMOUNT |   | CATEGORY | AMOUNT |   |   |   |   |   |
| 2 | ROOM RENTAL | $800 |   | OFFICE SUPPLIES | $500 |   |   |   |   |   |
| 3 | TEE SHIRTS | $120 |   |   |   |   |   |   |   |   |
| 4 | RED SQUARE TABLE SUPPLIES | $150 |   |   |   |   |   |   |   |   |
| 5 | CELL PHONE | $45 |   |   |   |   |   |   |   |   |
| 6 | PRINTING AND COPIES | $200 |   |   |   |   |   |   |   |   |
| 7 | BOOKS | $300 |   |   |   |   |   |   |   |   |
| 8 | MISCELLANEOUS | $300 |   |   |   |   |   |   |   |   |
| 9 | MONTHLY MOVIE NIGHT | $75 |   |   |   |   |   |   |   |   |
| 10 |   |   |   |   |   |   |   |   |   |   |
| 11 |   |   |   |   |   |   |   |   |   |   |
| 12 |   |   |   |   |   |   |   |   |   |   |
| 13 |   |   |   |   |   |   |   |   |   |   |
| 14 |   |   |   |   |   |   |   |   |   |   |
| 15 |   |   |   |   |   |   |   |   |   |   |
| 16 |   |   |   |   |   |   |   |   |   |   |

MINIMUM $45   SUM $1,990   COUNT 8

FIG. 23

|   | A | B | C | D | E |
|---|---|---|---|---|---|
| 1 | ITEM | AMOUNT |  | CATEGORY | AMOUNT |
| 2 | ROOM RENTAL | $800 |  | OFFICE SUPPLIES | $500 |
| 3 | TEE SHIRTS | $120 |  |  |  |
| 4 | RED SQUARE TABLE SUPPLIES | $150 |  |  |  |
| 5 | CELL PHONE | $45 |  |  |  |
| 6 | PRINTING AND COPIES | $200 |  |  |  |
| 7 | BOOKS | $300 |  |  |  |
| 8 | MISCELLANEOUS | $300 |  |  |  |
| 9 | MONTHLY MOVIE NIGHT | $75 |  |  |  |
| 10 |  |  |  |  |  |
| 11 | MINIMUM | $45 |  |  |  |

MINIMUM $45   SUM $1,990   COUNT 8

FIG. 24

SIMPLIFIED DATA INPUT IN ELECTRONIC DOCUMENTS

BACKGROUND

With the advent of modern computing devices, use of small-form and touch or gesture controlled devices has become widespread. However, data input with such devices can be difficult either owing to the small-form display space or to a lack of traditional physical keyboard functionality. It is common with such devices to launch a "soft" keyboard on a lower half of a display space, but such "soft" keyboards often consume a great amount of the available display space which makes data input cumbersome and inefficient. In addition, with complex data entry, such as formula or function entry in a spreadsheet application document, small-form or "soft" keyboard entry is made even more difficult by the learning required by a typical user to enter the correct sentence structure (syntax) required by the associated software application. Thus, there is a need for an improvement and technical advantage that allows for simplified data and formula or function syntax entry in computer-implemented electronic documents and user interfaces.

It is with respect to these and other considerations that the present invention has been made.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present invention solve the above and other problems by providing an improvement and technical advantage that allows for simplified data and formula and/or function syntax entry in computer-implemented electronic documents and user interfaces, simplified data and/or syntax entry in electronic documents. According to one embodiment, a variety of custom user interface components and selectable controls may be provided that may float on a displayed document. Such user interface (UI) components and controls allow for easier data or syntax input, and owing to their floating nature, they may be moved out of the view of the user as the user reads or otherwise reviews or interacts with the underlying document.

According to other embodiments, electronic inking gestures may be used for entry of data and/or programming syntax in an electronic scratch pad and/or directly on top of a displayed electronic document. In addition, gestures (e.g., screen touches) may be used for selecting document components (e.g., spreadsheet ranges) followed by an interpretation by the associated application of the user's gestures. The application's interpretation of the user's gestures may be presented to the user in a tool tip or similar UI component. Based on the application's interpretation of the user's gesture, the application may autosuggest data completion, data calculation, formula entry, function syntax, and the like. The application autosuggestion may be accepted or rejected by the user.

According to another embodiment, data entry and/or UI component disambiguation may be provided. If a user selects via touch or other gesture a display area or UI component, and the user selection is ambiguous, for example, where the user's finger touches two adjacent controls simultaneously, a variety of disambiguation displays, interactions and/or hints may be provided to help the user make a proper selection.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention.

FIG. 2 illustrates a floating calculator user interface component disposed on an example spreadsheet document.

FIG. 3 illustrates a floating function user interface component disposed on an example spreadsheet document.

FIG. 4 illustrates a floating scratchpad disposed on an example spreadsheet document.

FIG. 5 illustrates a floating keyboard user interface component disposed on an example spreadsheet document.

FIGS. 6 and 7 illustrate a docked scratchpad disposed in proximity to an example spreadsheet document.

FIGS. 8 and 9 illustrate in-document gesture interaction with an example spreadsheet document.

FIG. 13 illustrates a pre-existing array of data in an example spreadsheet document.

FIG. 14 illustrates a selection of a range of data in an example spreadsheet document and illustrates an autosuggested computation for data contained in the selected range.

FIG. 15 illustrates a selection of a range of data in an example spreadsheet document and further illustrates an autosuggested computation for data contained in the selected range and further illustrates suggested alternative functions and results for a selected range of data.

FIG. 22 illustrates contextual operations and/or functions that may be suggested or provided in association with a range of data.

FIGS. 23 and 24 illustrate contextual operations and/or functions that may be suggested or provided in association with a range of data and illustrates a movement of a function and associated computational results into an example spreadsheet document.

DETAILED DESCRIPTION

Figure 1:
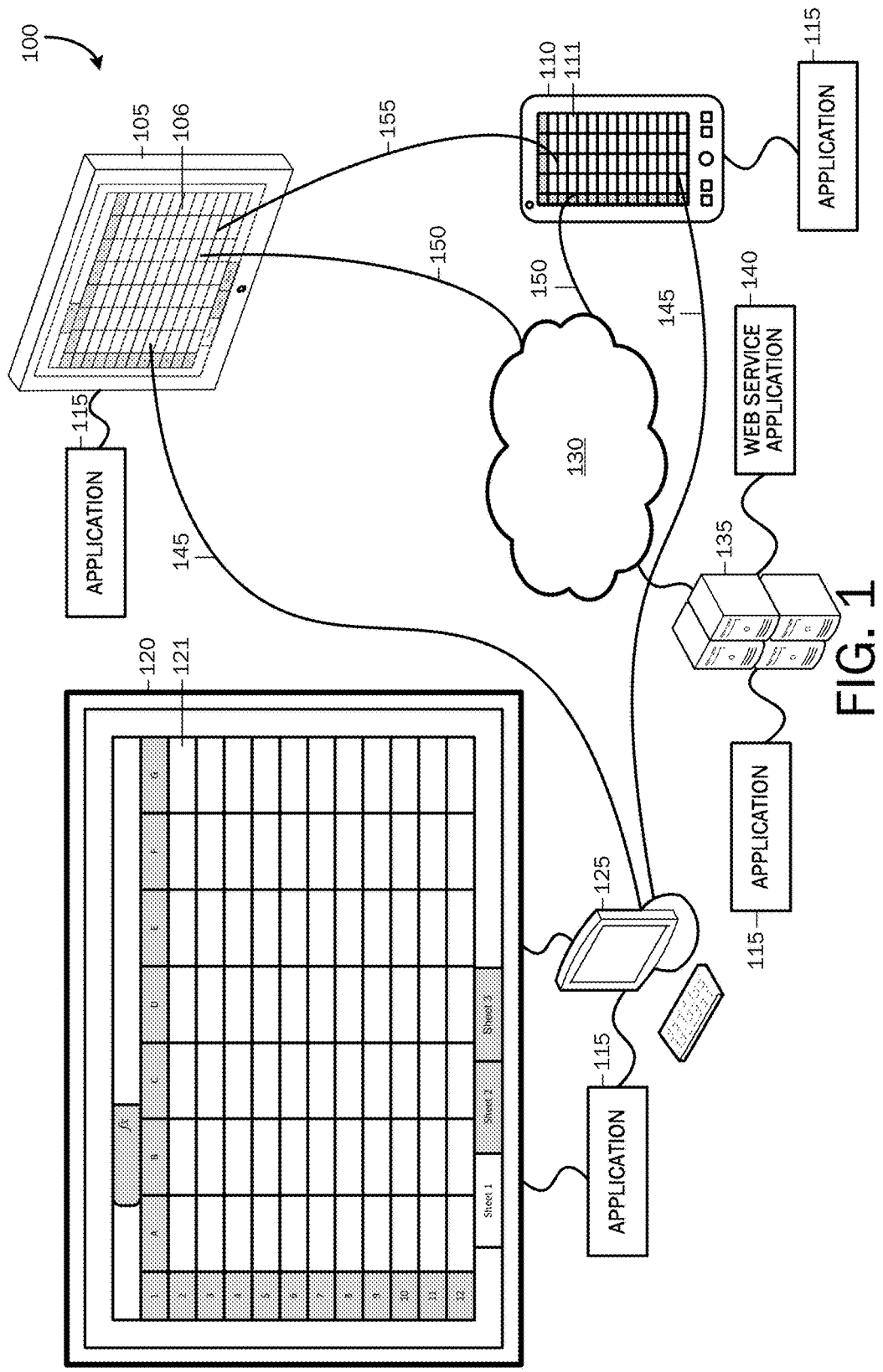
FIG. 1 illustrates a system architecture in which embodiments of the present invention may be practiced.

As briefly described above, embodiments of the present invention are directed to simplified data and/or programming syntax entry in electronic documents. According to embodiments described below, custom user interface components and controls may be provided to a user for assisting the user in data entry and in entry of complex formulas, functions, or other content. In addition, embodiments provide for using electronic inking and other gestures for interacting with a variety of electronic documents. Autosuggested user interface components, programming syntax, and computational results may be provided in a variety of application documents, and disambiguation assistance may be provided in response to an ambiguous user input.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described may be modified by substituting, reordering, or adding stages to the disclosed methods. Accordingly, the following detailed description does not limit the invention but, instead, the proper scope of the invention is defined by the appended claims.

FIG. 1 illustrates a system architecture in which embodiments of the present invention may be practiced. In FIG. 1, a variety of computing devices are illustrated with which embodiments of the present invention may be practiced on individual computing devices or in a collaborative work session. For example, a small-form smartphone or other handheld computing device 110 is illustrated having a display surface 111 and being associated with an application 115. A larger form tablet-style computing device 105 having a display surface 106 and an associated spreadsheet application 115 is illustrated. A large display device 120 having a display surface 121 is illustrated being associated with a computer 125 and a spreadsheet application 115.

As should be appreciated, the computing devices 105, 110, 120, 125 are purposes of illustration only and are not exhaustive of the various types of computing devices that may be used in accordance with embodiments of the present invention. For example, while the display device 120 is illustrated as a display unit with an associated computing device 125, the large-form display device 120 may operate as an integrated display/computing device that may be used for any suitable use from large-scale display uses, for example, in a conference room, to personal computing, as desired. According to embodiments, each of the computing devices illustrated in FIG. 1 may receive input through a variety of suitable means including touch or gesture input, keyboard input, mouse input, voice command input, electronic inking input, and the like.

Referring still to FIG. 1, the software applications 115 illustrated in association with each of the computing devices 105, 110, 120, 125 are illustrative of any of an application having sufficient computer executable instructions for enabling embodiments of the present invention as described herein. For example, applications 115 may include spreadsheet applications, word processing applications, slide presentation applications, electronic mail applications, notes taking applications, desktop publishing applications, and the like. An example spreadsheet application 115 includes EXCEL manufactured by Microsoft Corporation of Redmond, Wash. As should be appreciated, this example spreadsheet application is but one example of the many applications suitable for enabling embodiments described herein may be used.

Each of the computing devices 105, 110, 120, 125 may operate in a collaborative work environment through one or more wired or wireless data connections 145, 150, 155. That is, each of the computing devices may communicate with each other through wired or wireless data lines via direct connection, or via connection through a distributed computing network 130 such as an Internet or intranet.

According to embodiments, application functionality associated with each of the computing devices 105, 110, 120, 125 may operate according to one or more variations. For example, each application 115 may be a fully functional "thick" client application having all application functionality including the ability to send and receive data to and from other applications 115 operating on other computing devices in the collaborative work session. Each such application not only has its native functionality, for example, spreadsheet functionality, but according to embodiments of the present invention, each such application also contains sufficient computer executable instructions for allowing each application to operate as a control application for controlling information sent from a control device for receipt by an endpoint display device in a collaborative work environment. Likewise, each such application has sufficient computer executable instructions for allowing the application to operate as an endpoint display device for receiving control functions from another computing device.

According to another embodiment, the computing devices 105, 110, 120, 125 may communicate via a distributed computing network 130, for example, the Internet. Referring still to FIG. 1, the computing device 135 is illustrative of an Internet-based or "cloud-based" server computer on which may be operated one or more web services applications 140 for providing a collaborative work session, as described herein. According to this embodiment, each of the devices 105, 110, 120, 125 may operate as thin client systems, and collaborative communication between the devices may be operated at the direction of the web services application 140 operated at a remote site. According to this embodiment, an application 115 may operate at the remote server 135 wherein each of the devices 105, 110, 120, 125 may access and receive the functionality described herein via a remote service from the server based application 115, for example, via the web services application 140.

As briefly described above, one distinct drawback of touch or gesture controlled computing devices, particularly small-form computing devices, such as a smart phone 110 or a tablet-style computing device 105, involves data entry and manipulation on the touch or gesture controlled display surfaces of such computing devices. With such computing devices, upon an indication of desired text or data entry, typically, a "soft" keyboard is displayed on a lower half or portion of the display surface for allowing a user to enter various keystrokes by touching the buttons or controls contained in the displayed "soft" keyboard. Unfortunately, such "soft" keyboards typically take a significant amount of display space of the computing device, and while the "soft" keyboard is displayed, all text, data, images and the like displayed underneath the displayed "soft" keyboard are covered from view. Thus, a typical user launches the "soft" keyboard, enters one or more data items, dismisses the "soft" keyboard to see the results of the data entry, followed by re-launching the "soft" keyboard for additional data entry, data editing, and the like. Such a process is cumbersome, inefficient, and tiring to the user. In order to avoid this outcome, users often purchase a separate physical keyboard device for mating with the touch or gesture optimized computing device. According to embodiments of the present invention, a variety of custom user interface (UI) components and controls may be provided for allowing on-display and in-document data entry and editing without having a large "soft" keyboard displayed over a significant portion of the user's display surface, and a variety of electronic inking and autosuggested data and syntax entry are enabled.

In FIG. 2, an example spreadsheet document 205 is illustrated in which an array of data 210 has been entered, as desired. As should be appreciated, the example spreadsheet document 205 is for purposes of illustration and example only and is not exhaustive of the vast numbers of document types that may be utilized in accordance with embodiments of the present invention. For example, embodiments of the present invention are equally applicable to other document types, for example, word processing documents, slide presentation documents, notes application documents, electronic mail application documents and content, desktop publishing application documents, and the like. That is, embodiments of the present invention may be equally applicable to any electronic document that may be displayed on a display surface of the computing devices 110, 105, 120, 125 for which entry and/or editing of one or more data items is desired.

Referring still to FIG. 2, a floating 10-key user interface component 215 (e.g., a keyboard) is illustrated on the document 205 for allowing a user to enter one or more numeric data items and for allowing the user to select one or more arithmetic functions to be applied to the one or more data items. As should be appreciated, the floating 10-key user interface component 215 may be launched according to a variety of suitable means, including, selection of a button or control designated for launching the 10-key user interface component 215, a voice command for launching the 10-key user interface component 215, a touch or gesture interpreted by the application 115 as desiring a launching of the 10-key user interface component 215, and the like. For example, according to one embodiment, the 10-key user interface component 215 may be launched automatically by the application 115 based on a user selection of one or more data items in the array of data 210 and based on a context associated with the user selection. For example, referring to the array of data 210, column A includes a number of text items, column B includes a number of mixed alphanumeric strings, but columns C and D include numeric strings only. Thus, according to one embodiment, if a user selects one of the numeric-only items illustrated in columns C and D, the application 115 associated with the displayed document 205 may interpret the user's selection as indicating that the user wishes to enter or edit numeric data. In response, the floating 10-key user interface component 215 may be automatically launched and displayed as a floating object on the displayed document 205. If the user does not wish to utilize the 10-key user interface component 215, the user may, of course, dismiss the displayed keyboard.

If the displayed keyboard is displayed over data being reviewed by the user, the user may easily move the displayed keyboard to a different location on the displayed document to expose data of interest to the user. Thus, the floating keyboard (10-key user interface component 215) may be moved around on the surface of the document for receiving numeric data entry associated with a selected portion or area of the document 205.

In addition, as illustrated in FIG. 2, a number of functions 220 are displayed in a floating keyboard (10-key user interface component 215) for allowing the user to enter and/or edit various formulas, functions, or other arithmetic symbols in association with the data items contained in the example data array 210. If the application 115 in use with the example document 205 is a spreadsheet application, then the functions 220 may be utilized for entering or associating arithmetic functions with a given cell contained in the document 205 for operation on one or more data items contained in the document. According to embodiments, use of the lightweight small-form floating user interface component 215 allows a user to move the keyboard (10-key user interface component 215) to a position in close proximity to data being entered and/or edited by the user. Thus, not only may the user avoid having a static display of a "soft" keyboard overlaying a large portion of the user's data, the user may avoid tiring eye switching between data items being entered and/or edited and a statically displayed "soft" keyboard, wherein the user may place the floating keyboard (10-key user interface component 215) adjacent to entered and/or edited data.

As illustrated in FIG. 3, a floating user interface component in the form of a formula or function user interface 305 is provided. The user interface 305 may include one or more pre-defined computational functions 310, for example, sum, average, count, maximum, minimum, number count, and the like. A number of arithmetic functions 315 are also provided for operation on one or more data items, as desired. As described above with reference to FIG. 2, the user interface component 305 may be launched according to a variety of suitable means and may be displayed in a floating manner on a displayed document 205 and may be moved around so that the user interface component 305 may be placed at a location that is desired by the user.

According to embodiments, the various functions 310 available in the user interface component 305 may be utilized for applying pre-defined computational or arithmetic functions to one or more data items contained in the document 205. For example, if a user selects a range of data, for example, all the data illustrated in column D of the document 205, the user may then select one of the provided functions (e.g., sum), and the associated function will be automatically applied to the selected range of data. As illustrated in FIG. 3, according to one embodiment, the result of the applied function (e.g., a preview 320) may be automatically displayed in the user interface component 305 beneath the selected range of data (or other suitable location) to give the user a preview of the result of applying the selected function to the range of data.

According to one embodiment, upon selection of a given range of data, each available function may be automatically applied to the range of data, and the result 320 may be displayed in the user interface component 305 underneath the function designator. The user may decide which of the functions he/she actually wants to apply to the selected range, followed by a selection of the appropriate key, and the function will then be applied to the range of data, and the result may be displayed in the appropriate cell. For example, if the user is interested in summing the data contained in column D of the example spreadsheet document 205, the user may receive a preview 320 of a summation of the selected range of data before the user actually selects the sum function for application to the selected range of data.

Figure 4:
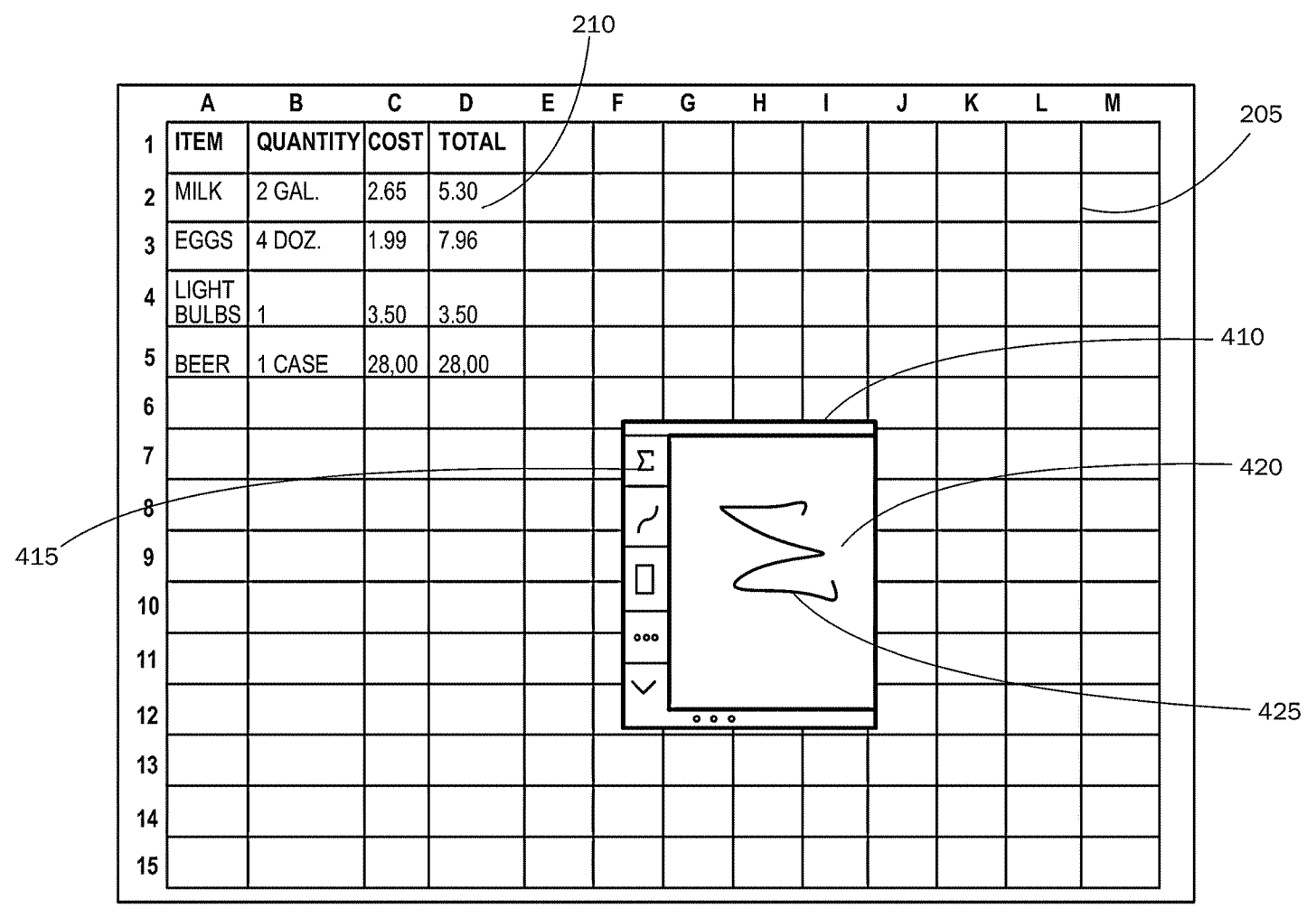

As illustrated in FIG. 4, the floating function scratchpad 410 may be displayed over the example document 205 on the display surface of the computing device 105, 110, 120, 125 for allowing the user to select various pre-defined functions and for allowing the user to handwrite various data and/or functions on the surface 420 of the scratchpad 410. If a user selects on of the pre-defined function symbols, the associated function symbol may be automatically displayed on the scratchpad surface 420 for application to a data item or selected range of data items. Alternatively, the user may handwrite a function symbol or function text on the scratchpad surface, as illustrated in FIG. 4, for application to the data item or range of data.

According to the latter embodiment, the application 115 associated with the displayed document 205 is operable to interpret handwritten text and symbols and for applying interpreted handwritten text and symbols to its functionality for applying the functionality to one or more data items contained in the document 205. For example, as illustrated in FIG. 4, a sum symbol 425 has been handwritten by a user on the scratchpad surface 420 for applying a sum function to a selected set of data items. For example, a user may have selected a set of data items, for example, the data items contained in column D of the example spreadsheet 205 for which the user desires to apply a sum function. According to embodiments, the user may first use a touch or other gesture to select the desired column of data items, followed by using a touch or other gesture, for example, with a finger, stylus, or other touch operable device for handwriting or drawing a sum symbol 425 on the scratchpad surface.

After the handwritten symbol 425 is entered into the scratchpad 410, the application 115 interprets the handwritten entry and then automatically applies the interpreted function to the selected data. As should be appreciated, if the handwritten symbol may not be interpreted by the application 115, an error dialog, for example, a displayed tool tip may provide information to the user to alert the user that the application 115 does not understand the entered text or other symbol 425. In such a case, if the application 115 interprets the entered text or symbol as associated with two or more available functions, a user interface component may be automatically displayed to allow the user to select among the two or more possible functions, as illustrated below with respect to FIG. 15. For example, if the user's handwritten sum symbol 425 is interpreted as two or more functions that may include summation, each of the two or more possible functions may be presented to the user to allow the user to select a particular function for application to the desired data items.

As illustrated in FIG. 5, another example of a floating user interface component 510 is illustrated that may be launched onto a document 205 for allowing efficient data entry, editing, and manipulation. The user interface component 510 is in the form of a "QWERTY" style keyboard with which a user may enter one or more text strings, but the keys of the keyboard user interface component 510 may be arranged in any desired order. For example, referring to the document 205, the array of data 210 includes four columns of data A-D. Column A includes a number of text entries. By launching the keyboard user interface component 510, the user may move the floating keyboard into a position adjacent to the array of data 210 followed by entering one or more text items, as desired.

For example, referring to the array of data 210, if the user desires to change the word "milk" displayed in cell A2 to the word "beverage," the user may select the example cell A2. Upon selection of example cell A2 containing a text item, the application 115 may interpret the selection as requiring the entry of text items, and the application 115 may automatically launch the floating keyboard user interface component 510 to allow entry of text items as opposed to automatically launching a numeric keyboard 215, as illustrated and described above with reference to FIG. 2. According to other embodiments, the keyboard user interface component 510 may be launched by selecting one or more buttons or controls for launching user interface components, or the keyboard user interface component 510 may be launched by a variety of other means, for example, voice input, and the like. Once the keyboard user interface component 510 is launched onto the document 205, the keyboard user interface component 510 may be moved around on the document 205 to allow the user to uncover data initially contained underneath the displayed keyboard user interface component 510 or to move the keyboard user interface component 510 into a position that makes data entry efficient, for example, adjacent to a cell, row, column, image, text selection, and the like for which the user desires to enter and/or edit one or more text items.

As illustrated and displayed above with reference to FIGS. 2 through 5, a variety of custom user interface components and controls may be displayed on a display surface of the user's computing device 105, 110, 120, 125 and may be displayed as floating objects that may be quickly and efficiently moved around the display surface as desired by the user for efficient data entry and edit relative to other data displayed on the display surface. According to embodiments, the user interface components illustrated and described above are for purposes of example and illustration only and are not exhaustive of other types of floating user interface components that may be displayed on the display surface in association with a displayed document or other content item. For example, a calendar function user interface control may be displayed for allowing a user to enter and/or edit various calendar entries, for example, dates, appointments, and the like. A clip art or image user interface component may be displayed as a floating object for allowing a user to apply various clip art items, images, photographs, and the like available from one or more local or remote libraries of such objects. A mapping interface component may be displayed as a floating object for allowing a user to apply various mapping functions to a displayed document. An information search user interface component may be displayed on the document 205 as a floating object with which a user may obtain helpful information from the associated application 115, or in which an instance of an Internet web browsing application may be launched for obtaining information that may be used in association with the document 205, and the like.

In addition to the foregoing, a floating clipboard control user interface component may be provided. A floating clipboard control user interface component may allow for a quick access to copy/paste history or calculator or computational device memory. For example, if a user entered a text or numeric string previously, or if the user copied/pasted a given text or numeric string, a history of such text or numeric strings may be recalled using a floating clipboard control user interface component to allow the user to retrieve the same text or numeric strings for pasting, dropping or otherwise inserting into the document 205 at one or more additional locations.

In addition, a floating user interface component displayed on the document 205 may contain one or more functions or controls of the application 115, for example, editing functions, formatting functions, and the like to allow the user to move the floating user interface component to a position in proximity to text or data for which the user requires various functions of the associated application 115. For example, if formatting functions are displayed in a floating user interface component, the user may move the floating user interface component adjacent to a text selection, and the user may then select one or more formatting functions from the floating user interface component for application to the desired text selections. Thus, as should be appreciated, a floating user interface component, as illustrated and described above with reference to FIGS. 2 through 5 may be utilized for containing any available application function or information that may be useful for entering and/or editing data items of various types in any type of document 205.

According to one embodiment, a floating user interface component 215, 305, 410, 510, illustrated above with reference to FIGS. 2 through 5, may be customized by a user to form a general content (data and functions) entry user interface as desired by the user. For example, if a given user utilizes a certain array of alphanumeric functions or certain types of functions available to a given application, a given floating user interface component may be customized to contain selectable keys or buttons for those application functions the user requires on a regular basis. Thus, when a customized user interface component is launched, those application functions most often needed by the user will be available in the floating user interface component for use in association with one or more documents 205.

In addition to the foregoing, user interaction with the floating user interface components illustrated and described above with reference to FIGS. 2 through 5 may be accomplished according to a variety of user interaction methods. For example, the floating user interface components may be interacted with via touch, as described above. In addition, the user interface components may be interacted with according to traditional keyboarding and mousing functions, as well as, voice and gesture functions. According to a voice command function, after a given user interface component is launched, as illustrated above with reference to FIGS. 2 through 5, voice commands received by the computing device 105, 110, 120, 125 may be interpreted in the context of the launched user interface component. For example, if the alphabetic keyboard interface 510, illustrated in FIG. 5, is launched, then voice commands provided by a user may be interpreted as being directed to the presently launched alphabetic keyboard user interface component. Thus, if a user utters letters, for example, "a", "b", "c", the corresponding characters on the launched alphabetic keyboard user interface component 510 may be selected by the application 115, and resulting text entry may be accomplished.

As briefly described above, many functions, for example, arithmetic functions associated with spreadsheet application documents, as well as complex text entry and formatting functions associated with other types of documents may be difficult for a user to properly structure in terms of the required sentence structure (syntax), or may be difficult to enter using a small-form or touch optimized text or data entry system. Thus, embodiments of the present invention described below provide for an autosuggest functionality in association with user input for assisting a user with obtaining desired functionality via user touch or other input without fully understanding the required syntax for commanding the desired functionality.

As briefly described above, in addition to utilization of one or more user interface components that may be displayed on or in association with a document 205, embodiments of the present invention provide for electronic inking and other touch or gesture interactions for entering and editing one or more data items or operations/functions contained in or associated with an electronic document 205. As illustrated in FIG. 6, an example spreadsheet document 205 is illustrated as displayed on a display surface of a computing device 105, 110, 120, 125 and a pre-existing array of data 210 is illustrated in the displayed document 205. According to one embodiment, upon an appropriate user interaction, for example, selection of a button or control, a single tap on the display surface containing the document 210, a mouse entry, a keyboard entry, voice command, or the like, a working pane 610 may be displayed for containing displaying one or more user interface components, as illustrated and described above with reference to FIGS. 2 through 5, and/or any number of functionality buttons or controls for applying one or more functions of an application 115 to the displayed document 205.

According to embodiments illustrated in FIG. 6, an inking scratchpad 615 may be provided in the working pane 610 for receiving a variety of handwritten texts, symbols, or other notations for applying to the document 205. As illustrated in FIG. 6, the inking input pad or scratchpad 615 is positioned in the work pane 610 as a docked or stationary user interface as opposed to a floating user interface component as described above. For example, according to one embodiment, a user may first select one or more data items or a range of data items contained in the array of data 210 in the document 205 followed by entry of a handwritten text string or symbol 620 in the inking scratchpad 615. After an entry of the handwritten text or symbol 620, the user may select the symbol via touch or other gesture 625, and the application 115 associated with the document 205 may interpret the handwritten text or symbol, in the same manner as described above with reference to FIG. 4, and the interpreted text or symbol may then be applied to the selected data item or range of data items contained in the document 205.

Referring still to the scratchpad 615, a text box or text window 630 is illustrated in which the application's interpretation of the entered handwritten text or symbol may be presented. For example, if the sum symbol 620 is entered, as illustrated in FIG. 6, after selection of data items contained in cells D2, D3, D4, D5, and if the application 115 interprets the handwritten symbol as requesting a sum function to be applied to the selected data items, the interpreted function may be presented in the text box or text window 630 to provide confirmation to the user that the appropriate interpretation of the user's handwritten injury has been received.

Figure 7:
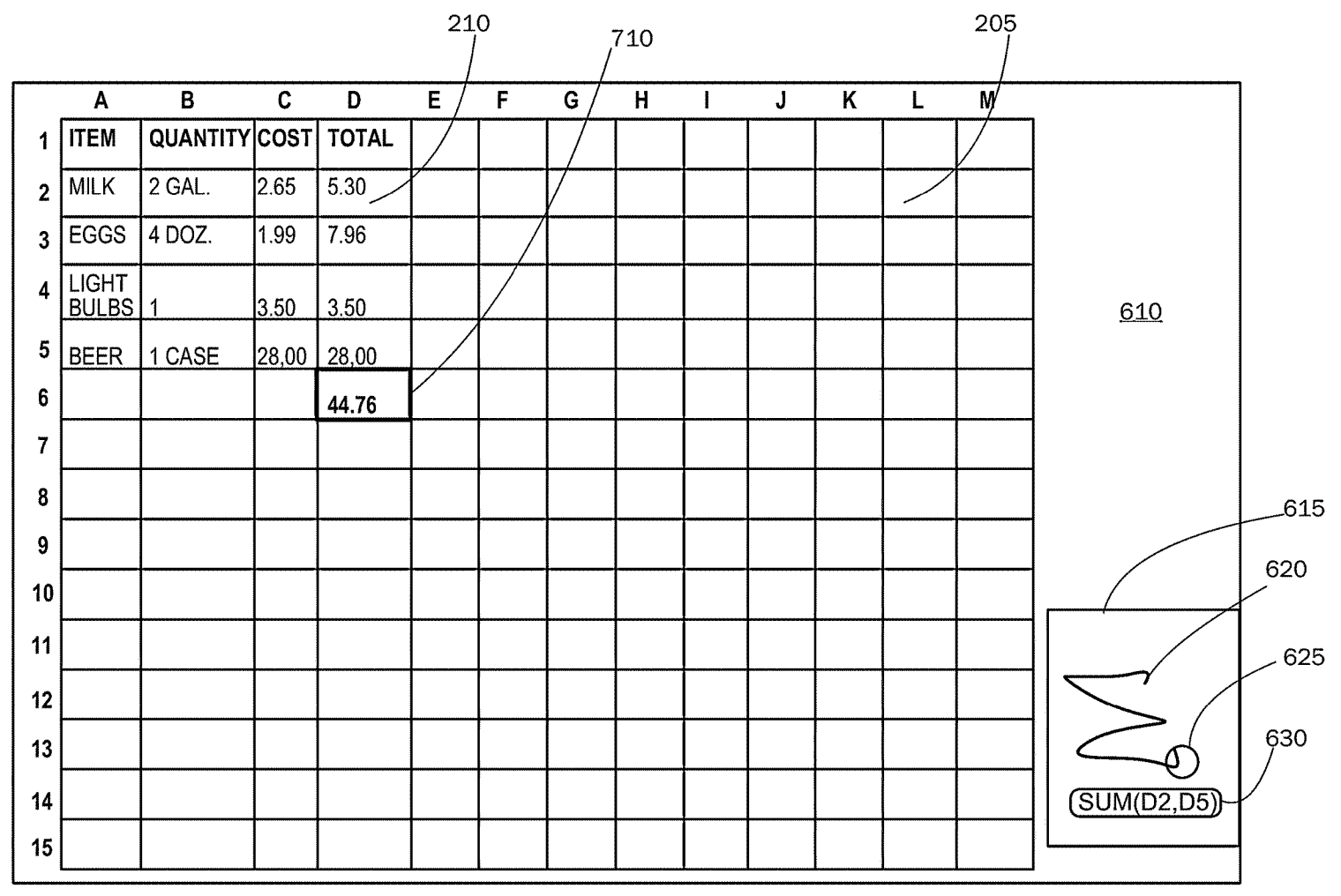

Referring to FIG. 7, according to one embodiment, the entered and interpreted handwritten text or symbol may be automatically applied to the selected data items. For example, if the entered symbol indicated a sum function to be applied to the data items contained in column D of the document 205, then a summation of those data items may be displayed at cell D6, as illustrated in FIG. 7. Alternatively, before the interpreted function is automatically applied to the selected data items, as illustrated in FIG. 7, a user interaction may be required, for example, tapping on the text box 630 to indicate acceptance of the interpreted functions, or one or more selectable buttons or controls for accepting or rejecting the interpreted function may be provided with which a user may affirmatively accept or reject the interpretation of the user's inking input.

As should be appreciate, the example of a handwritten sum function illustrated in FIGS. 6 and 7 are for purposes of example only. The scratchpad 615 may be utilized for receiving an enormous variety of handwritten text items and/or symbols 620 that may be interpreted by the application 115 in association with the functionality of the application 115. For example, if the application 115 is a spreadsheet application, then any number of arithmetic symbols and/or functions, for example, plus signs, minus signs, divide signs, equal signs, square root symbols, and the like may be handwritten on the scratchpad 615 for interpretation by the example spreadsheet application. In the case of another type of application, for example, a word processing application, a variety of text items and symbols may be entered and may be interpreted by the example word processing application. For example, if the letter "C" is interpreted by word processing application for a copy function, then entry of a handwritten "C" in the scratchpad 615 may be interpreted by word processing application as a user's desire to copy a text selection. As should be appreciated, any handwritten text or symbol that may be interpreted by a given software application as indicating a selection of a function available to the software application may be utilized in accordance with embodiments of the present invention.

Figure 8:
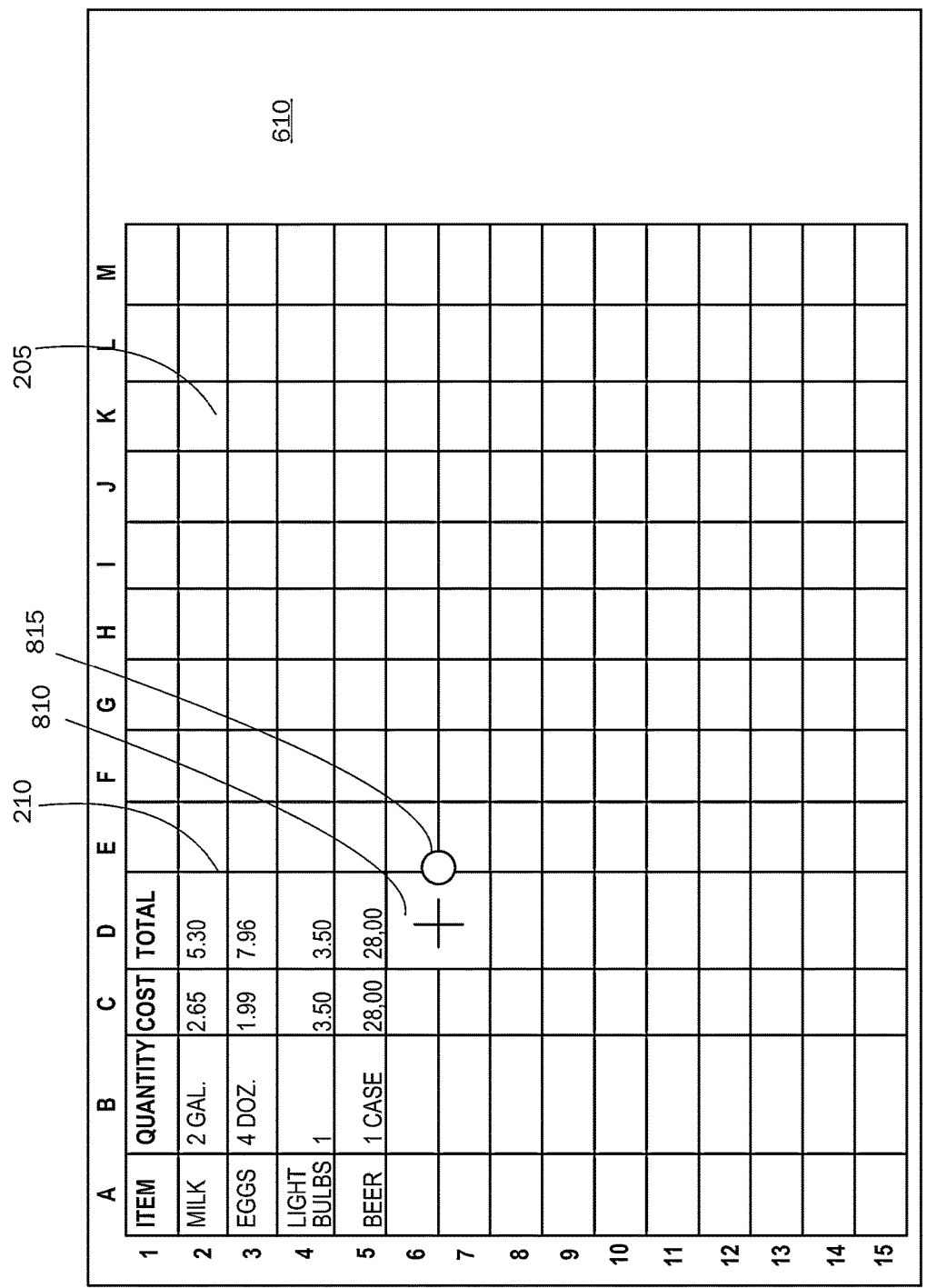

As illustrated in FIG. 8, an array of data 210 has been entered into an example spreadsheet document 205. According to embodiments, in addition to entering handwritten text or symbols in a designated handwriting scratchpad, as illustrated and described above with reference to FIGS. 4, 6, and 7, according to embodiments, handwritten text or symbols may be entered directly on the document 205 without the use of a designated scratchpad, and entered text items and/or symbols may be interpreted by the application 115 for application of associated functionality to the document 205. Referring to FIG. 8, after selection of a given data item or range of data items, for example, the data contained in cells D2, D3, D4, D5, a user handwrites a plus sign "+" symbol 810 in an area of the document 205 immediately beneath the selected data ranges because the user desires to add the data items contained in the selected data range. After the user enters the desired text or symbol 810, the application 115 may automatically interpret the entered text or symbol for application of the associated functionality.

Referring to FIG. 9, if the application 115 interprets the entered plus sign symbol 810 as indicating that the user wishes to sum the data contained in the selected data range, then a summation 910 of the data contained in the selected data range may be displayed in the cell beneath the selected data range or at another desired location, as illustrated in FIG. 9. Alternatively, after the user enters a handwritten text or symbol 810, as illustrated in FIG. 8, a selection, for example, a touch 815 may be required by the user over the handwritten text or symbol to cause the application 115 to interpret the entered text or symbol for application, as described above. As should be appreciated, the example plus sign 810, illustrated in FIG. 8 is for purposes of illustration only and is not limiting of the vast number of text or symbols that may be handwritten directly on the document 205 for receipt and interpretation by the application 115 for providing associated and desired functionality to a data item or range of data items contained in the document 205.

According to embodiments, the location on the document 205 of the text or symbol entry may provide the application 115 with information for interpreting the entered text or symbol owing to the context associated with the entry location. For example, entry of the plus sign symbol 810 underneath a selected range of numeric items may assist the application 115 in interpreting the sign as a summation function to be applied to the data items contained in the selected range of data items because summation of a set of numeric data items is a typical and often used function in such a context. Other functions that may be used in a similar context may include such functions as average, minimum, maximum, number count, and the like. Thus, a text entry of "min" handwritten underneath the range of data items contained in the example cells D2-D5 may result in an interpretation by the application 115 that the user desires to identify the minimum value among the range of values.

As described above, arithmetic functions are but examples of the application of embodiments described herein. For example, if the document 205 is a word processing document, entry of a handwritten text item in association with a selected word or sentence may be interpreted as a user's desire to enter the text item at the selected location, or entry of a text selection interpreted as a function, for example, a formatting function, may be interpreted as the user's desire to apply the example formatting function to a selected text item.

Figure 10:
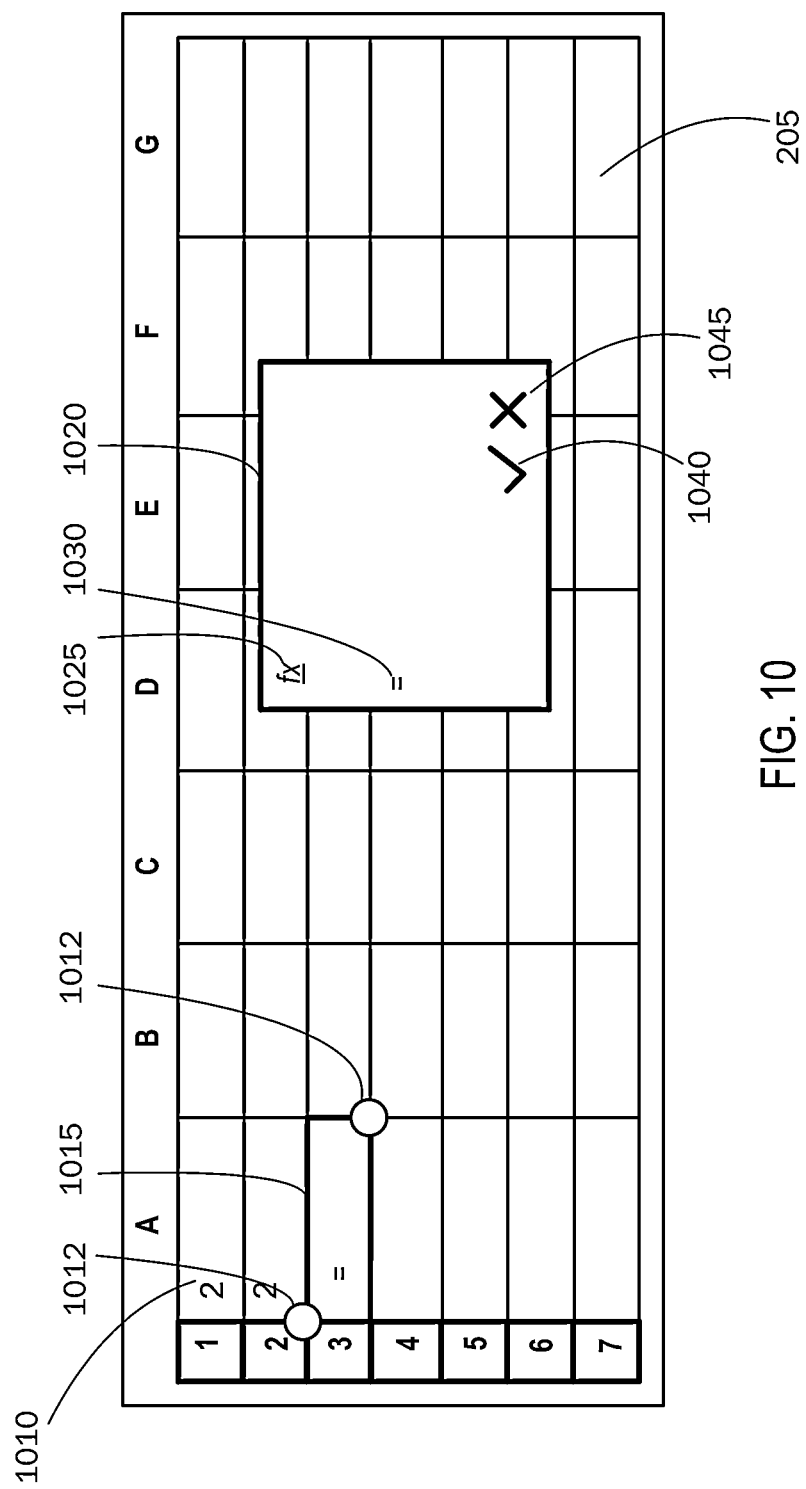
FIGS. 10 and 11 illustrate gesture interaction with an example spreadsheet document and illustrate a floating scratchpad for receiving user gestures.
Figure 11:
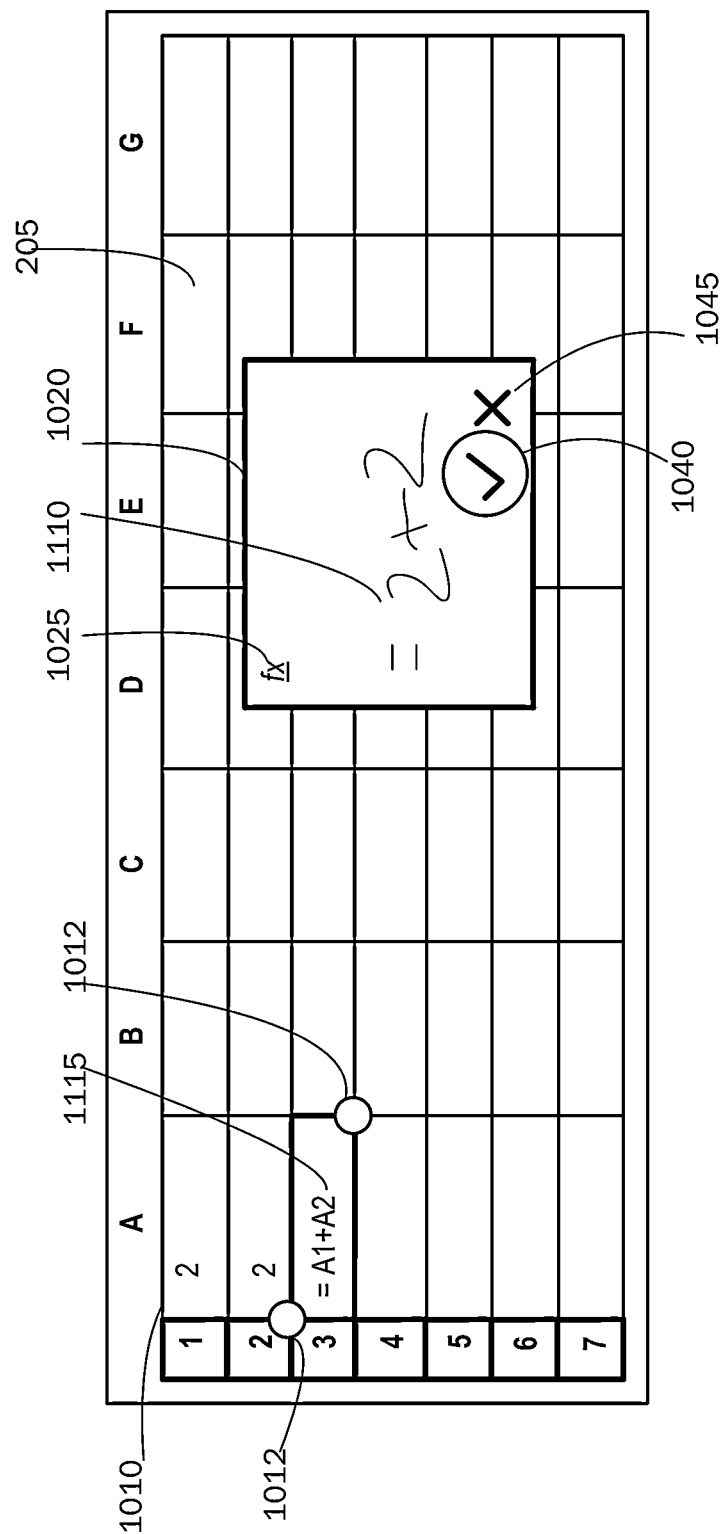
Figure 12:
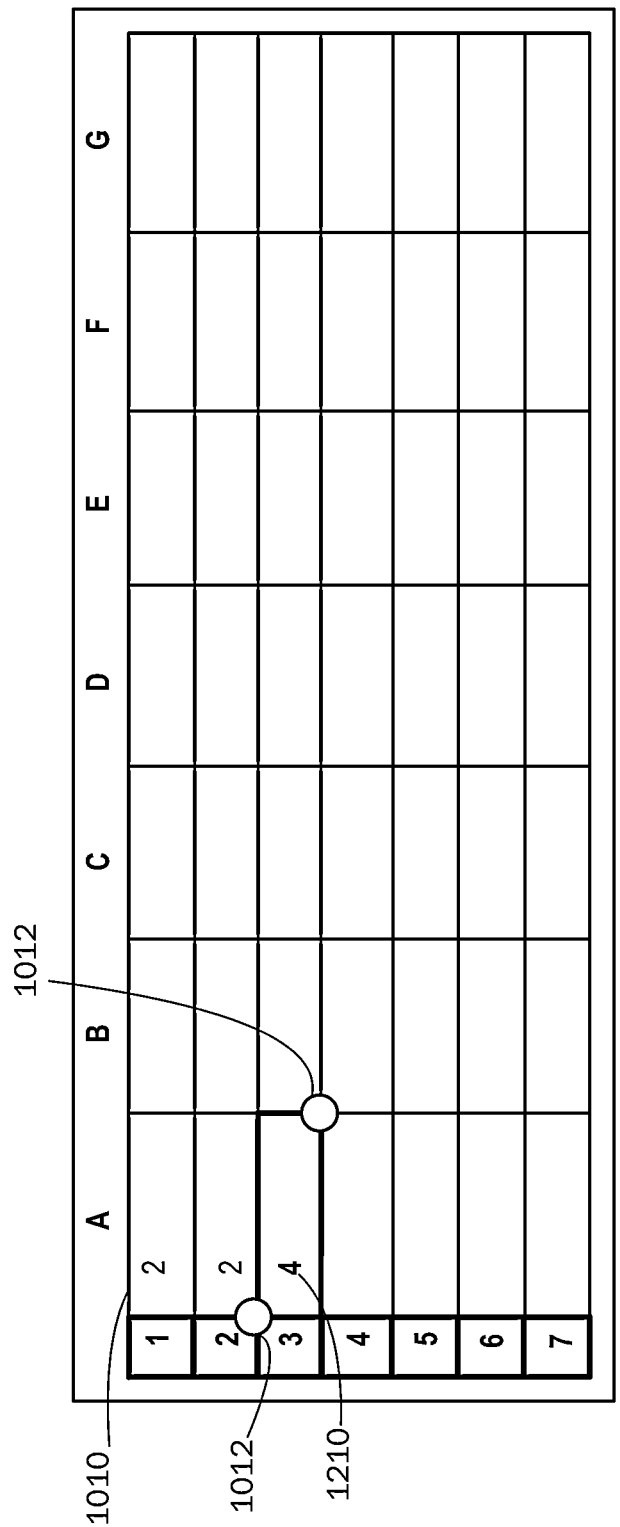
FIG. 12 illustrates a resulting computation and data display for the data entry illustrated in FIGS. 10 and 11.

Referring now to FIGS. 10, 11, and 12, a handwriting scratchpad 1020 may be displayed as a floating interface on a document 205 that may be moved around on the document 205 for entry of one or more handwritten text items or symbols. According to one embodiment, as described above with reference to FIGS. 4 and 6, the scratchpad 1020 may be operative for receiving one or more handwritten text items or symbols that may be interpreted by the application 115 as data entry items or as functions that may be applied to one or more data items contained in a document 205. According to the embodiment illustrated in FIGS. 10, 11 and 12, the scratchpad 1020 may be operative for receiving handwritten text or data entered by a user and for interpreting the handwritten text or data as a desired application function.

Referring to FIG. 10, the example spreadsheet document 205 contains two numeric entries of "2" in each of cells A1 and A2. Upon selection of a function key 1025 by tap, gesture, voice command, keyboard entry, mouse entry, and the like, the scratchpad 1020 may be set for receiving entries that will be interpreted as functions that may be applied to data contained in the example spreadsheet document 205. Referring to FIG. 11, if a user handwrites "2+2" into the scratchpad 1020 after selection of the function key 1025, the application 115 may interpret the handwritten text 1110 or data in the context of a function to be applied to a selected range, for example, cells A1 and A2, or in the context of a selection of cell A3 immediately beneath cells A1 and A2. According to embodiments, after the user enters the equals sign 1030, as illustrated in FIG. 10, in association with a selection of the function key 1025, the application 115 may recognize that the user desires to create a function in the scratchpad 1020 for application to the selected data range.

Referring still to FIG. 11, when the user enters a text string of "2+2" (e.g., handwritten text 1110) in reference to the data values contained in cells A1 and A2, the application 115 interprets the entered text string as a function for summing the values contained in cells A1 and A2 and translates the interpreted inking input into an associated formula or function syntax. Thus, a function having syntax of "=A1+A2" 1115 is illustrated as displayed in the cell A3 beneath cells A1 and A2 containing the two data values. According to embodiments, an accept function 1040 and a reject function 1045 may be provided in the floating scratchpad 1020 for allowing the use to accept or reject the autosuggested interpretation of the user's handwritten text or data entry. If the user selects the accept or commit function 1040, then the application 115 may automatically apply the interpreted function to the designated data range, and the values contained in cells A1 and A2 will be added, as illustrated in FIG. 12. Alternatively, if the user selects the reject function 1040, the scratchpad 1020 may be cleared for additional input by the user, or the application may present a second (or more) interpretation of the user's text or symbol entry to allow the user to either accept or reject the second interpretation of the text or symbol entry. In addition, if the user rejects the provided function, any automatic application of a result of the rejected interpreted function may be removed from the document 205.

As should be appreciated, the example text and/or symbol entries illustrated in FIGS. 10, 11, and 12 are for purposes of example only and are not exhaustive of the vast numbers of text or symbol entries that may be entered into the scratchpad 1020. For example, the scratchpad 1020 may likewise be utilized for receiving and interpreting functions associated with a different application, for example, a word processing application, wherein the function button or key 1025 may be replaced with a formatting function 1025, a text editing function 1025, and the like, and the scratchpad 1020 may then be optimized for receiving and interpreting text and/or symbols associated with various other functions (e.g., text functions).

Referring now to FIGS. 13, 14 and 15, another embodiment for autosuggesting functionality based on received user input is illustrated and described. As illustrated in FIG. 13, a document 205 is launched containing a pre-existing set of text items and associated data. For example, the array of text items and data 1310 may include a number of costs 1315 associated with various activities contained in a spreadsheet document being prepared by a user. As illustrated in FIG. 14, a user selects a range of data for which the user desires to perform a function. For example, the range of values contained in cells B2 through B9 is selected. Upon selection of the range of data items, according to this embodiment, the application 115 may automatically suggest a function, for example, a sum function, including automatically performing the function and automatically displaying the results of the function beneath the selected range of data.

As illustrated in FIG. 14, a value 1425 ($1,990) has been calculated as a sum of the values contained in the selected data range 1315. Adjacent to the displayed summation 1425 of the values contained in the selected data range is a user interface component 1420 showing the user the function that was applied to the selected data range and providing an accept function 1430, a reject function 1435, and an "other" function 1440. According to embodiments, if the user selects the accept function 1430, then the automatically suggested summation function may be persisted and the summation value 1425 may be maintained in its displayed position. Alternatively, if the user selects the reject function 1435, then the summation function applied to the selected data range may be discarded. According to one embodiment, if the user rejects the autosuggested function and result, then the application 115 may autosuggest a secondary or other function and result, for example, an average function, minimum function, maximum function, and the like. Alternatively, selection of the rejection function 1435 may discard the auto suggest function in association with the selected data range. If the user selects the other function 1440, then the application 115 may automatically suggest a secondary function that may be applied to the values contained in the selected data range, or the application 115 may provide a listing of other available functions that may be applied to the data items contained in the selected range, as described below with reference to FIG. 15.

As illustrated in FIG. 15, upon rejection of the first autosuggested function and result, a number of different operations may be automatically performed and may be displayed along with associated results for the selected data range in a user interface component 1510 displayed in proximity to the selected data range. Alternatively, whether the user selects the accept, reject, or other functions 1430, 1435, 1440, the application 115 may automatically provide the various operations and associated results for the selected data range in the user interface component 1510 upon selection of the data range 1315. That is, as soon as the user selects the data range 1315, the application 115 may perform a number of functions associated with such a range of data items, followed by a presentation of those functions and the associated results in a user interface component 1510, as illustrated in FIG. 15. One of the functions and its associated result may be automatically displayed underneath, above, or adjacent to the selected data range as a starting suggestion. According to one embodiment, a text string, 1525, for example, "SUM" may be automatically populated for the associated function result for identifying a value automatically populated for the associated function result. The user may accept the starting suggestion, or the user may select one of the other suggestions 1530, 1535, 1540, and the selected other suggestion will automatically be populated into the document 205. If the user does not like any of the suggested functions and results, the user may select an "other" function 1545, and the application 115 may provide additional functions and results that may be applied to and obtained from the selected data range.

Figure 16:
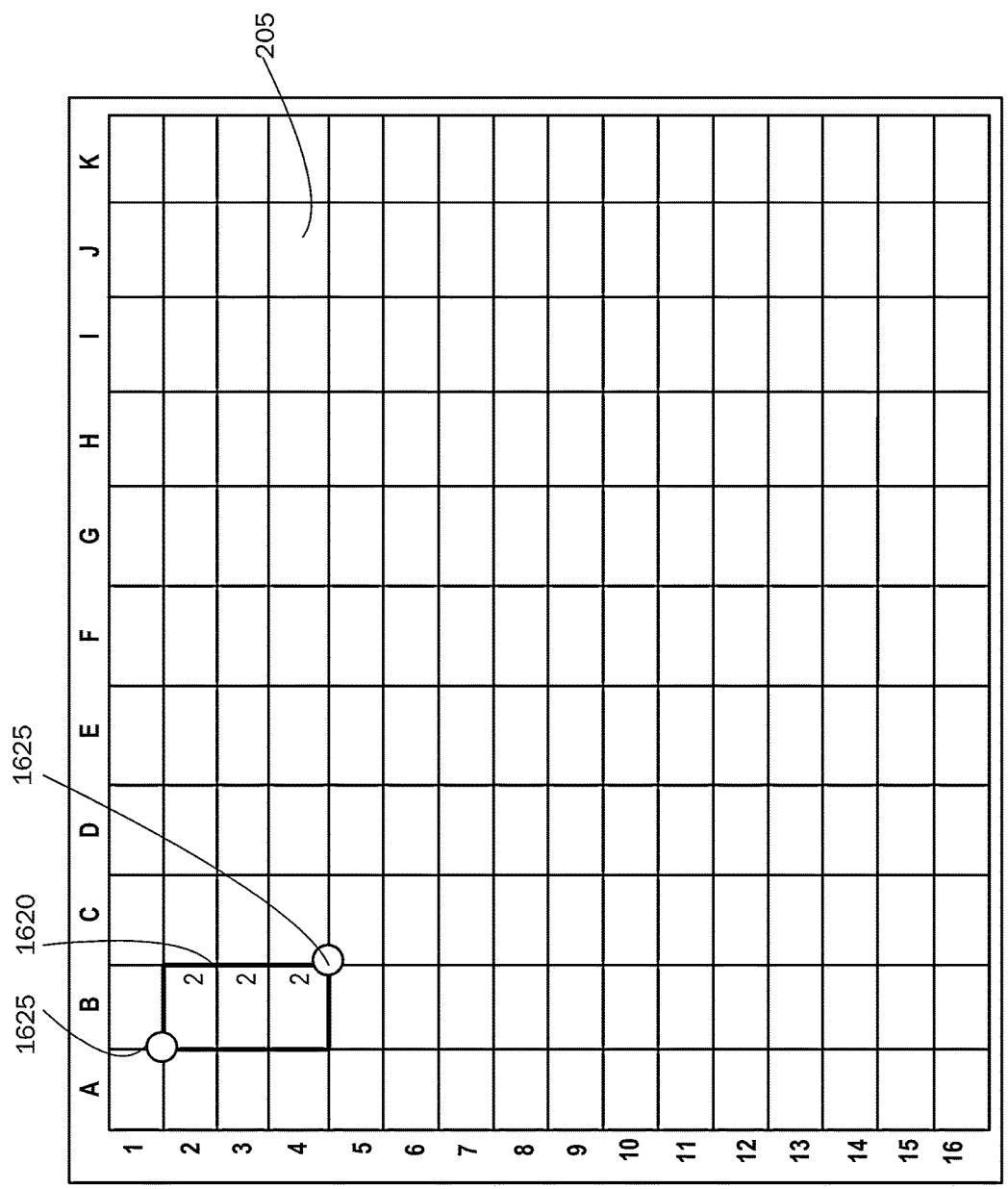
FIG. 16 illustrates a selected range of data in an example spreadsheet document.
Figure 17:
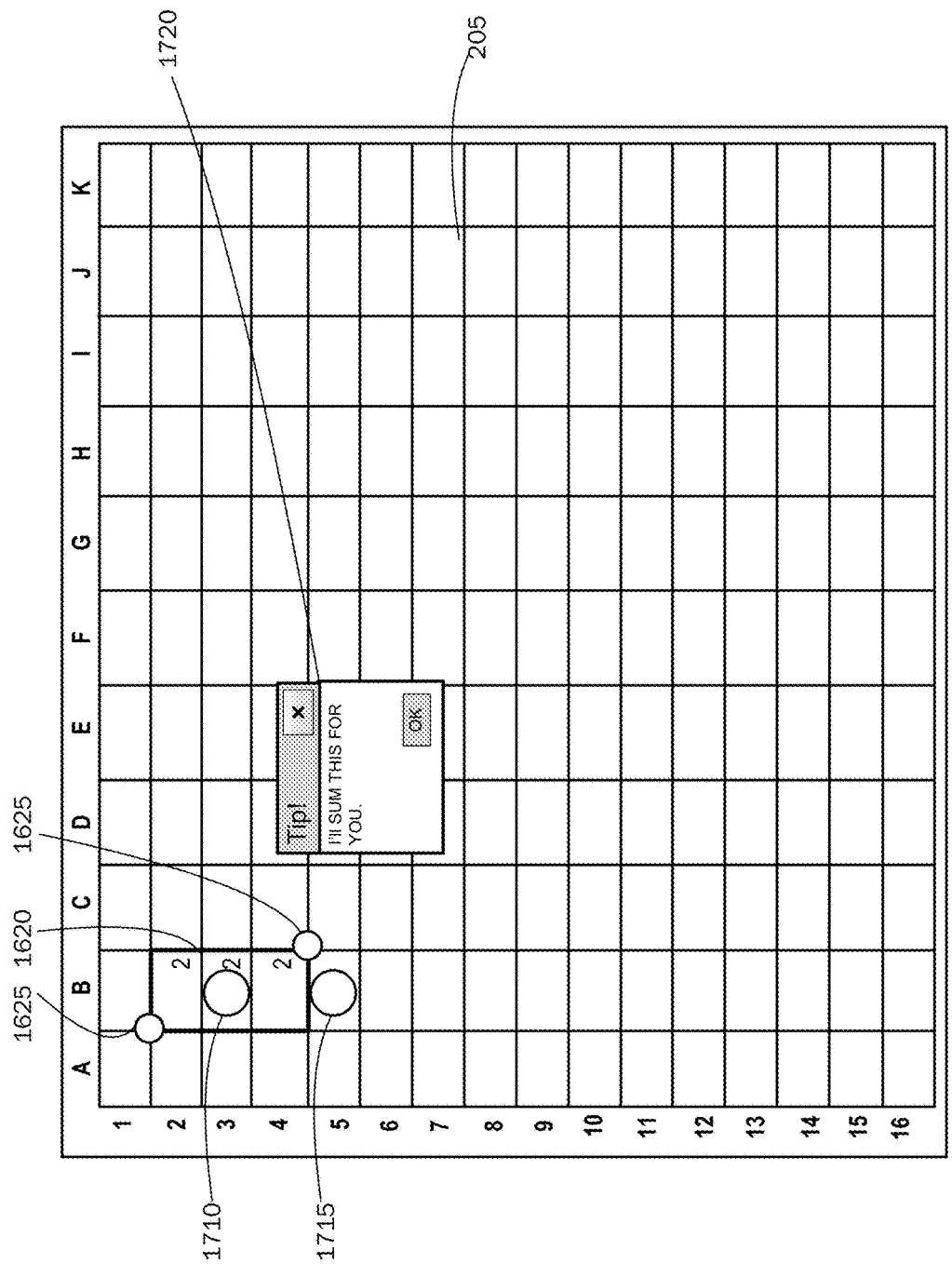
FIG. 17 illustrates a multi-touch gesture applied to the selected range of data illustrated in FIG. 16 and illustrates a displayed tool tip for providing information to a selecting user.
Figure 18:
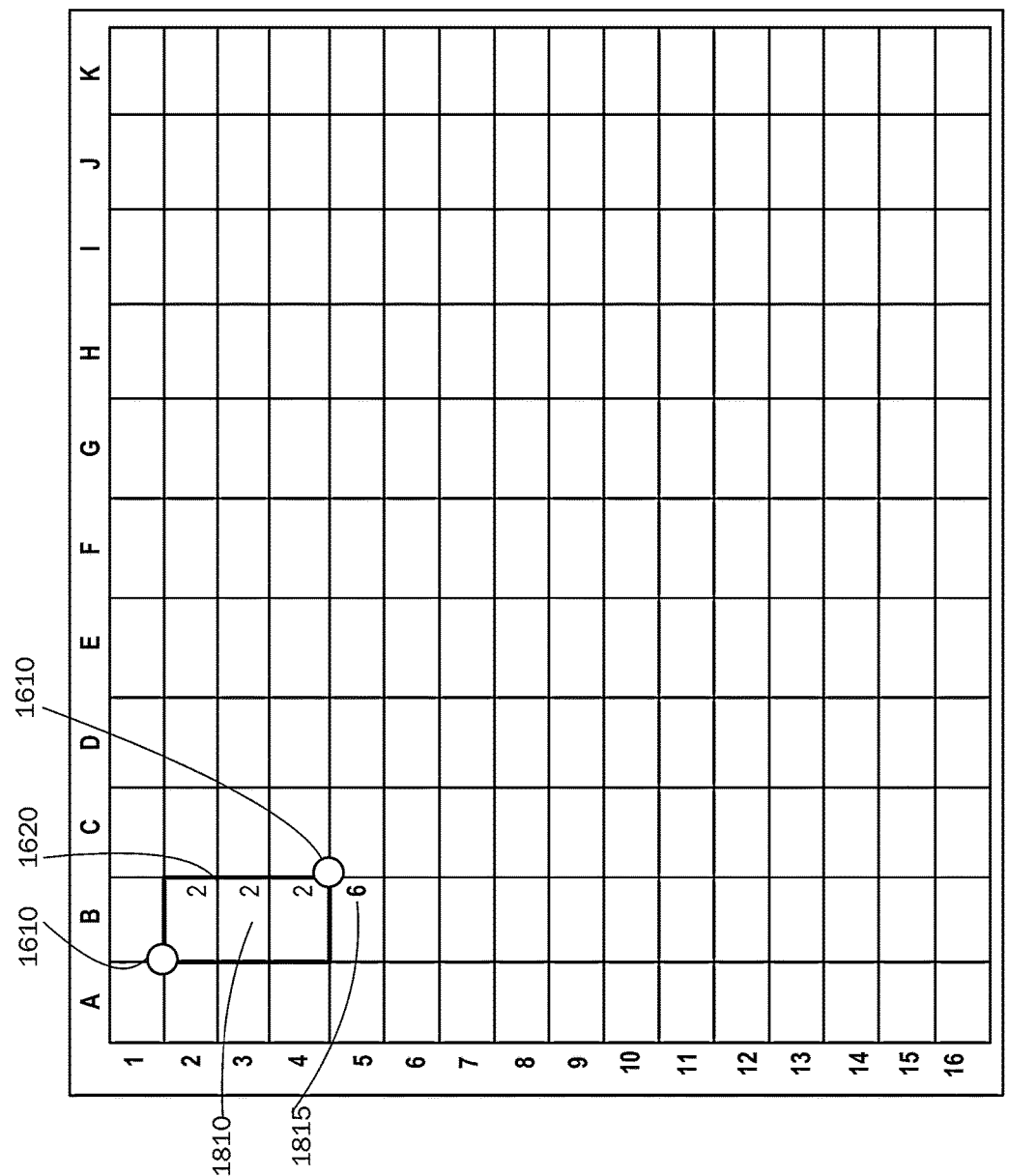
FIG. 18 illustrates an autosuggested and autocompleted function and associated data entry for the selected range of data illustrated in FIG. 17.

Referring now to FIGS. 16, 17 and 18, according to another embodiment, when a user selects a range of data, as illustrated in FIG. 16, a selected range may be highlighted or otherwise visually differentiated for indicating the boundaries of the selected range. Referring to FIG. 16, a highlighted selected range 1620 is illustrated, and after the range is selected and highlighted, a pair of resizing buttons 1625 may be provided for allowing the user to resize the selected range to include additional data items by gesture wherein the user touches and drags the resizing buttons until the selected range is expanded or contracted as desired by the user. As should be appreciated, the resizing buttons may also be actuated using other user interactions, for example, mousing interactions, voice commands, keyboarding interactions, and the like. As illustrated in FIG. 16, the selected range 1620 includes one or more data items in each of the example cells B2, B3, and B4.

Referring now to FIG. 17, according to an embodiment, a user may utilize a multi-point touch gesture illustrated by two fingertip touches 1710 and 1715 for actuating one point inside the selected range and a second point outside the selected range. As should be appreciated, the multi-touch interaction may also be performed with other touch means, for example, two stylus tips. According to embodiments, when the user presses and holds on the selected range, as illustrated by the touch point 1710, and simultaneously taps or touches at another location, for example, at the touch point 1715, an autosuggested function may be applied to the selected range, and the result of the autosuggested function may be displayed at the touch point 1715 outside the selected range.

Referring to FIG. 18, as a result, the application 115 may interpret the user touch selection inside the range as a desire for an available function that may be used in the context of a range of data items in the selected range. For example, any function that may be applied to such an array of data items, for example, a sum function, an average functions, a minimum function, a maximum function, a number count function, and the like may be interpreted by the application. According to embodiments, the application may autosuggest one of the functions, for example, a sum function, and may automatically display a summation result 1815 in the position where the second touch point 1715 was actuated. As should be appreciated, if the user does not desire the autosuggested example sum function, the application may be programmed to provide a secondary or other function, for example, an average function, for review by the user. Alternatively, a display of a number of possible functions and associated results, as illustrated and described above with reference to FIG. 15, may be provided in proximity to the selected range for showing the user other functions and results that may be selected for application to the selected data range.

Referring back to FIG. 17, a tool tip, balloon, or other similar user interface component 1720 is illustrated adjacent to the position of the second touch point 1715. Inside the tool tip 1720 is an example text string "I'll sum this for you." According to embodiments, because the application 115 is providing an autosuggestion for application of a given functionality to the selected data range, a tool tip 1720 may be utilized for alerting the user as to the suggested function that will be applied to the data range by the application 115. Thus, if the user receives information about the autosuggested function application, but disagrees with the intended autosuggestion, the user may request a different function, as described above. As should be appreciated, the tool tip, balloon or other similar user interface 1720 illustrated in FIG. 17 is for purposes of example and illustration only. Such a user interface component may be provided in association with any of the functions and user interface components described herein for providing information to the user about the provided user interface, the inking input interpretation, or about intended autosuggestion.

Figure 19:
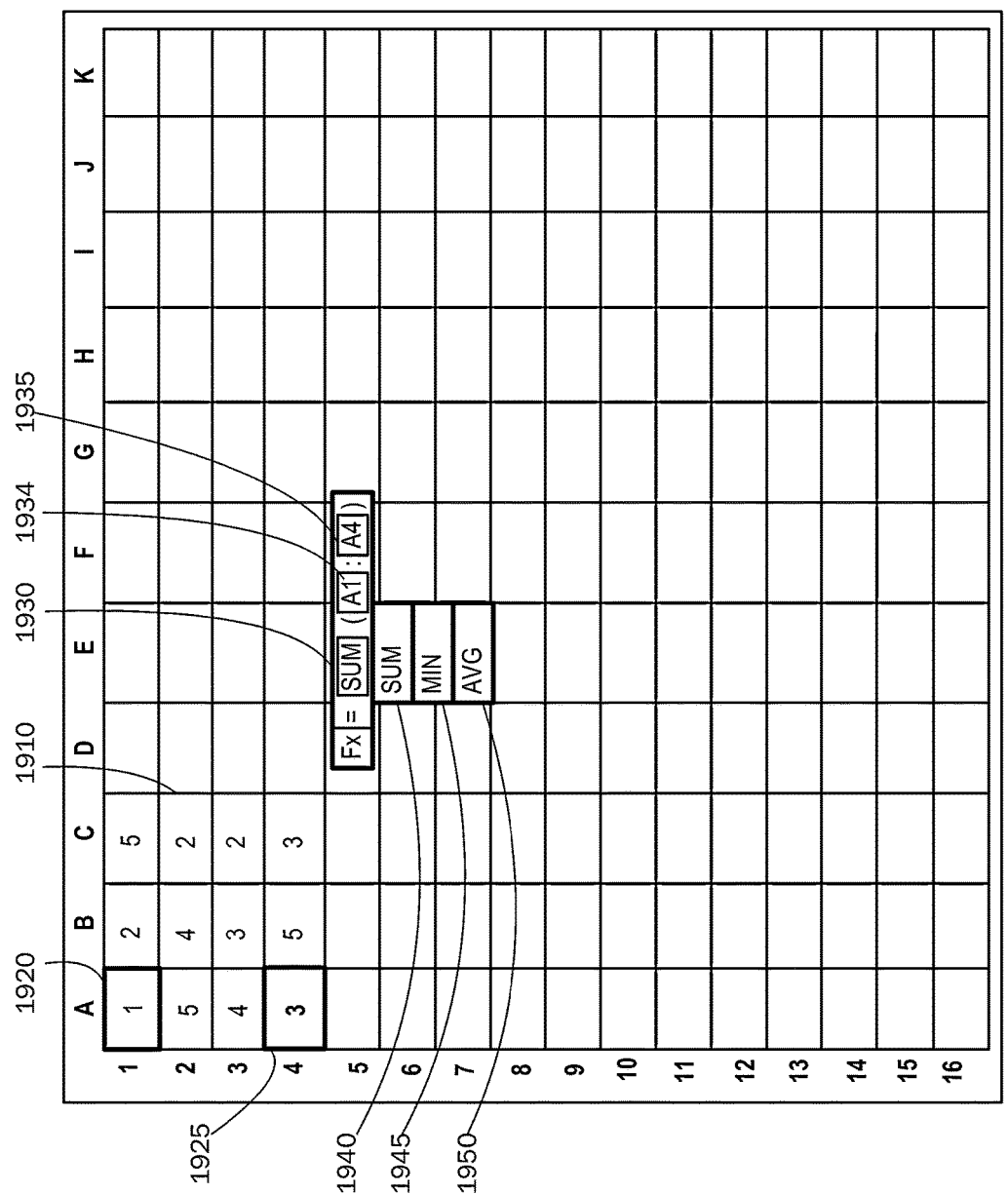
FIG. 19 illustrates a range of data in an example spreadsheet document and illustrates one or more suggested functions that may be applied to the range of data.

Referring now to FIG. 19, functions may be made touchable, for example, through use of one or more tokens. For example, referring to FIG. 19, a user may tap on a function token 1905 and see alternatives for other functions or operations that may be applied to one or more data items 1920, 1925 contained in an array of data 1910. As should be appreciated, alternatives for functions applied to one or more data items may be available based on the context of the data items and on the arguments selected and the available data. For example, upon selection of the function token 1905, an arithmetic argument in the form of "function (cell 1:cell2)" is provided. Upon selection of the function token 1930, a drop down may be provided showing various functions 1940, 1945, 1950 that may be selected for application to the arithmetic argument being generated. Next, selection of the cell tokens 1934, 1935 may allow for input of particular cells in the example spreadsheet 205, so that an example function of "SUM (A1:A4)" may be generated and so that the data contained in the selected cells will be applied to the generated arithmetic function. Once the desired function and desired cells are selected, the resulting operation may be performed on the data items contained in the selected cells, and the result may be displayed.

Figure 20:
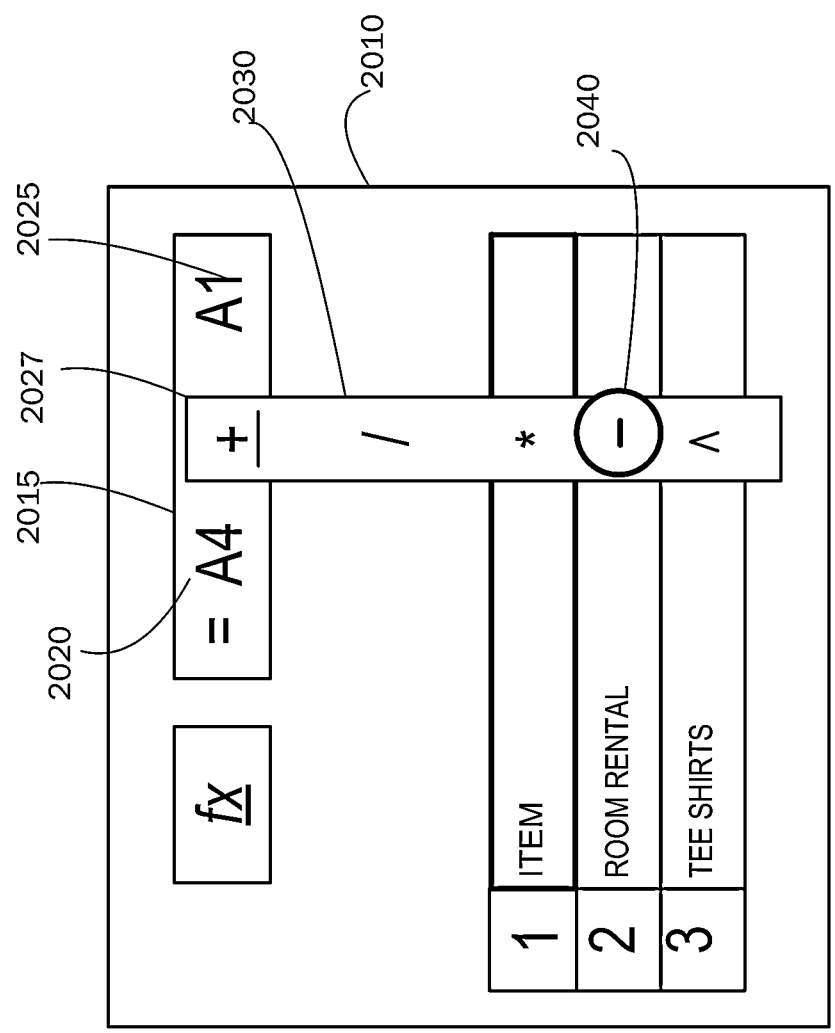
FIG. 20 illustrates tokenized arithmetic operations that may be suggested to a user for applying to one or more data items.

As illustrated in FIG. 20, a drop down menu associated with each selectable token is illustrated with which a user may select different functions and arithmetic operations. For example, selection of the arithmetic operation token 2027 may cause a drop down menu 2030 showing various arithmetic operations that may be selected, for example, the minus sign 2040 for applying to the function 2015 that will be applied to the selected cells 2020, 2025 (e.g., A4, A1). Thus, as illustrated in FIG. 20, instead of selecting a function token, as illustrated and described above with reference to FIG. 19, an arithmetic operation may be selected for applying directly to values contained in two or more selected cells. Once a given operation is selected, the operation may be automatically performed and the resulting value may be populated into a selected cell of the example spreadsheet document, as described herein.

Figure 21:
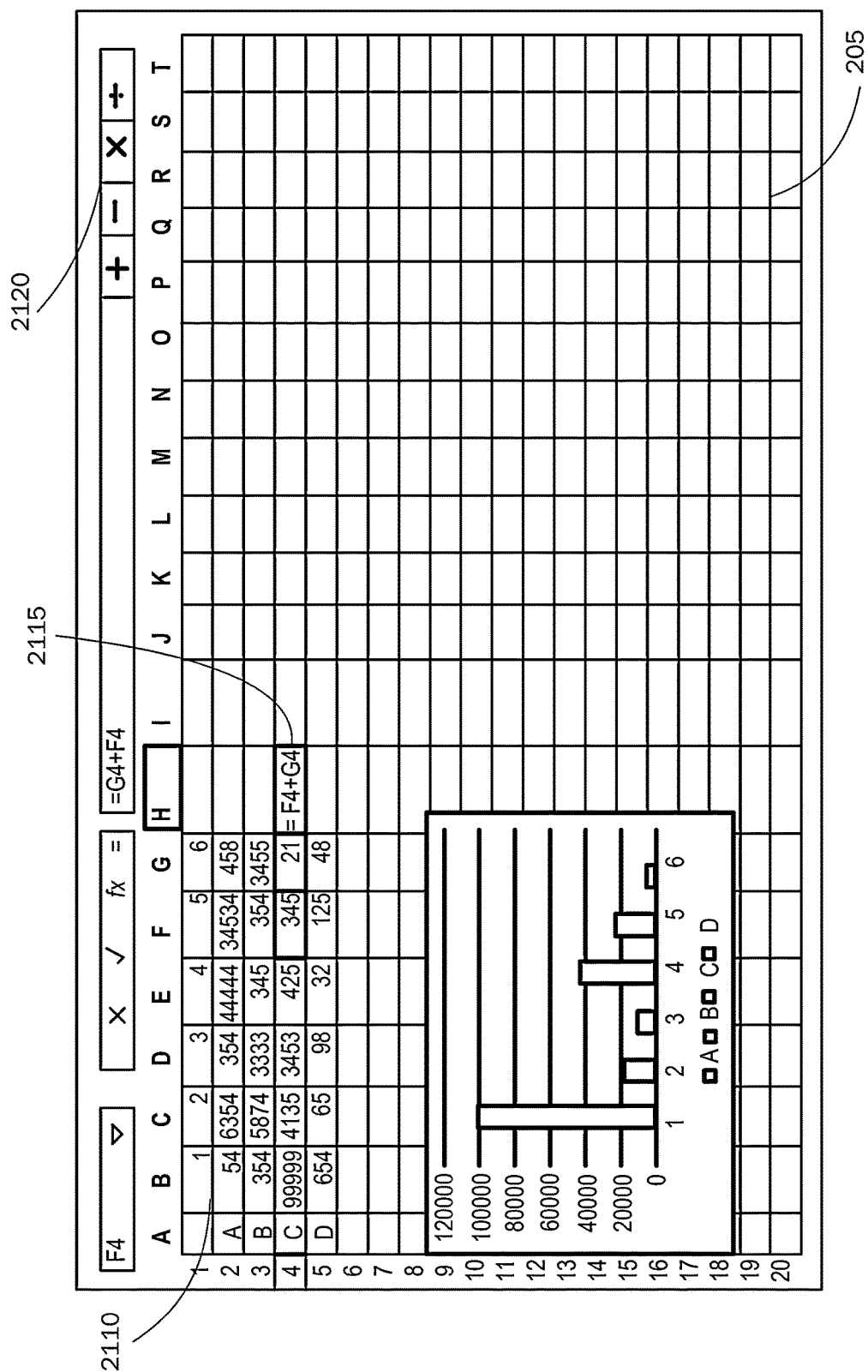
FIG. 21 illustrates contextual operations and/or functions that may be suggested or provided in association with a range of data.

Referring now to FIG. 21, according to an alternate embodiment, basic arithmetic operators, as well as other functions, may be provided as touch or gesture selectable operators and/or functions as part of a formula or function bar 2120. As should be appreciated, selection of one of the operators and/or functions in a formula bar 2120 may be performed in association with selected data items from an array of data items 2110. For example, if a user first selects cell F4, followed by a selection of cell G4, followed by a selection of the "plus" operator from the formula and/or function bar 2120, then a formula 2115 of "=F4+G4" may be automatically populated into the cell H4 for summing the data contained in the two selected cells. As should be appreciated, any of a number of selectable operators and/or functions may be provided in a formula and/or function bar 2120, as illustrated in FIG. 21.

Referring now to FIG. 22, after selection of a desired range of data items 2205, a number of functions 2220, 2210, along with automatically computed results 2225, 2230 for the selected range of data items, may be displayed in a status bar 2208 or other suitable user interface component. For example, an average function 2220 may be automatically populated in the status bar along with an average of the data items contained in the selected range. A sum function 2210 along with a sum 2230 may be populated in the status bar for the selected data range, or any other available function, for example, a minimum function, a maximum function, a number count function, and the like. According to embodiments, the user may, if desired, select one of the functions through a touch or other user interaction 2215, for causing the result of the selected function to be entered in the example document 205 in proximity to the selected range of data items.

Referring to FIGS. 23 and 24, according to an alternative embodiment, the user may drag a function 2310 from the status bar or other similar user interface component into the document 205 to a desired position in proximity to the selected data range. Once the user drops or otherwise deposits the dragged function and associated computed result onto the document at the desired location, as illustrated in FIG. 24, the function and associated result are automatically selected for the selected data range, and if desired, a legend in the form of a text string 2410 for identifying the selected function may be generated and displayed for identifying the nature of the listed function result 2405.

Figure 25:
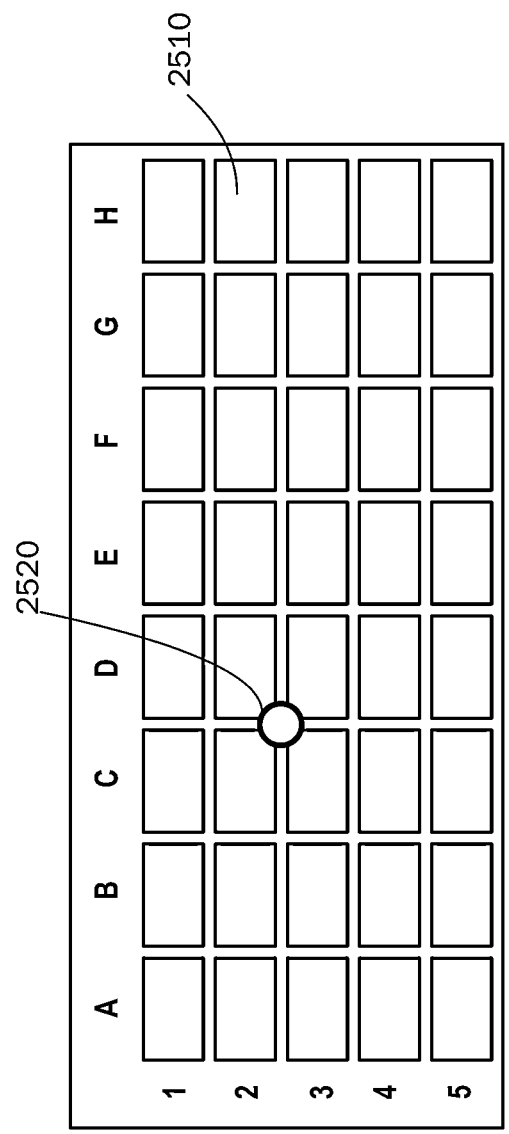
FIG. 25 illustrates an ambiguous user selection in an example spreadsheet document.

As briefly described above, owing to the small display forms of certain computing devices, for example, small-form smart phones, tablet-style computing devices, and the like, some touch or gesture user interface selections may result in an ambiguity owing to the fact that the touch, gesture or other user interaction fails to interact with an appropriate location on the displayed user interface to allow the application 115 to properly interpret the user's selection. As illustrated in FIG. 25, a user selection 2520 is illustrated on an example spreadsheet document 2510, wherein the user's selection touches at an intersection of four spreadsheet cells C2, C3, D2, D3. Thus, the user's selection creates an ambiguity because the spreadsheet application 115 associated with the example spreadsheet document 2510 cannot determine the cell actually intended for selection by the user.

Figure 26:
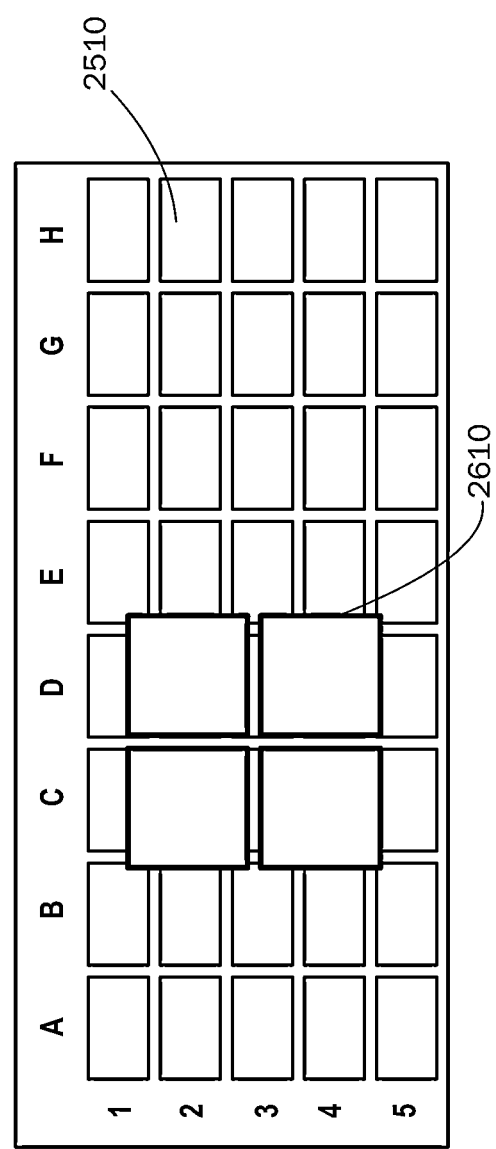
FIGS. 26 and 27 illustrate a disambiguation user interface component for assisting a user with the ambiguous selection illustrated in FIG. 25.
Figure 27:
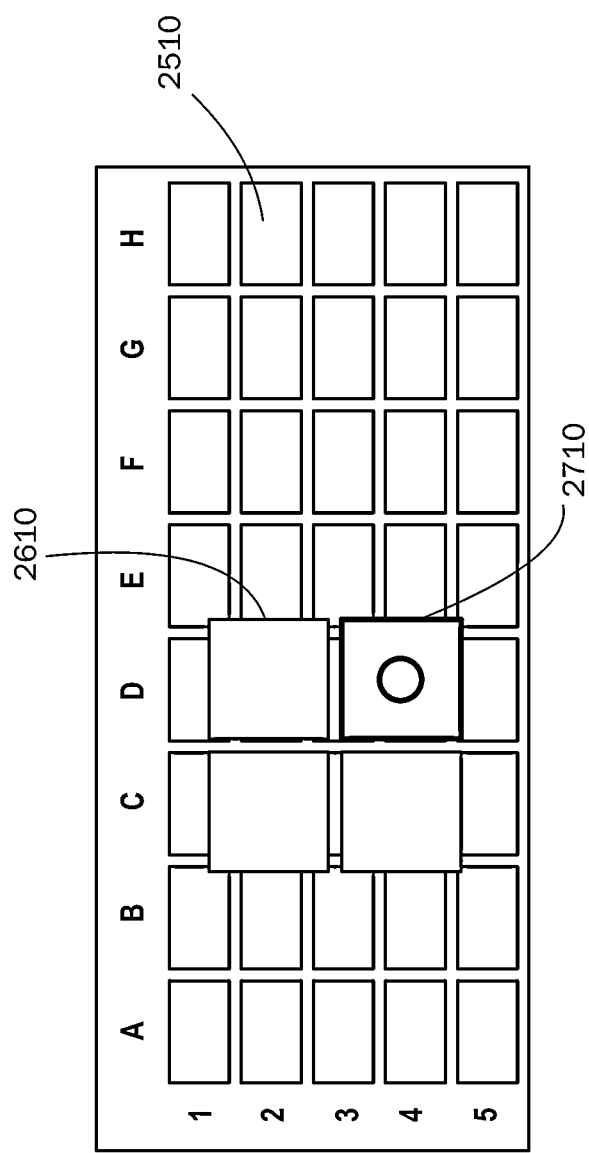

Referring now to FIG. 26 according to embodiments, a disambiguation user interface 2610 may be provided, wherein each of the four possibly selected cells are magnified so that the user may subsequently select the desired cell from one of the magnified cells. That is, if the user originally selected at the intersection between the example cells C2, C3, D2, D3, then all four cells are magnified to allow a user to more precisely select one of the magnified cells. As illustrated in FIG. 27, the user may now easily interact with the desired cell, for example, cell D3 for selecting the desired cell for data entry or for application of a desired function. Thus, the disambiguation user interface 2610 allows the user to enter a corrected input or selection where the first input or selection could not be interpreted by the application 115 owing to the ambiguous nature of the first input or selection.

As should be appreciated, other types of disambiguation functionality may be used for clarifying an ambiguous user selection. For example, each of the cells that may be the intended selection cell may be highlighted, colored, or otherwise distinguished from neighboring cells. Alternatively, voice interaction between the application and the user may be enabled, for example, wherein the application provides an audible alert of "did you intend to select cell C2, C3, D2, or D3?", followed by a voice command from the user such as "C3" which may be interpreted by the application as a selection of one of the possible cells.

Figure 28:
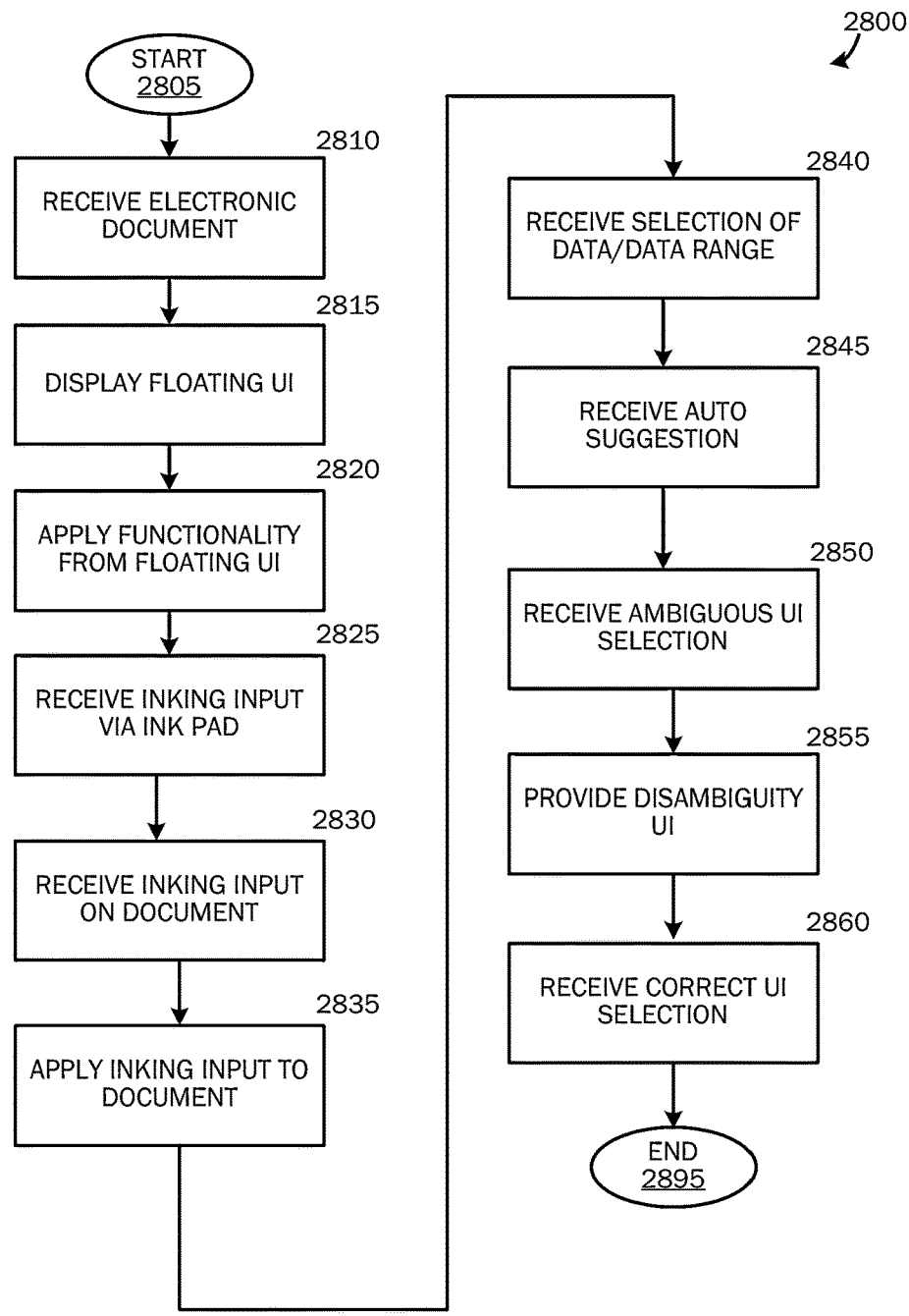
FIG. 28 is a flow chart illustrating a method of simplified data input in an electronic document.

Having described an operating environment and various aspects of embodiments of the present invention with respect to FIGS. 1 through 27 above, FIG. 28 is a flowchart of a method for providing simplified data input in electronic documents. The routine 2800 begins at start operation 2805 and proceeds to operation 2810 where an electronic document 205 is received and is displayed on a display surface of a computing device 105, 110, 120, 125 as described herein.

At operation 2815, a floating user interface component 215, 305, 410, 510 may be displayed as a floating object on the received electronic document for allowing the user to interact with the electronic document or with data contained therein according to the functionality of the application 115, as described above with reference to FIGS. 2 through 5. At operation 2820, a functionality selected from the floating user interface component may be applied to the displayed document, as desired.

At operation 2825, an inking input is received via an ink scratchpad, as described above, or at operation 2830, and inking input is received directly on the document 205, as described above. At operation 2835, the received inking input may be interpreted and applied to one or more data items contained in the document 205, as described above.

At operation 2840 a selection of an individual data item or range of data items is received in the document 205. At operation 2845, an autosuggestion of a functionality or functionality result is received for the selected data or data range for acceptance or rejection by the receiving user.

At operation 2850, an ambiguous user interface selection is received. At operation 2855, a disambiguation user interface is provided for allowing correct selection of a desired user interface component. At operation 2860, selection of a desired user interface component from the disambiguation user interface is received.

The method 2800 ends at operation 2895.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 29:
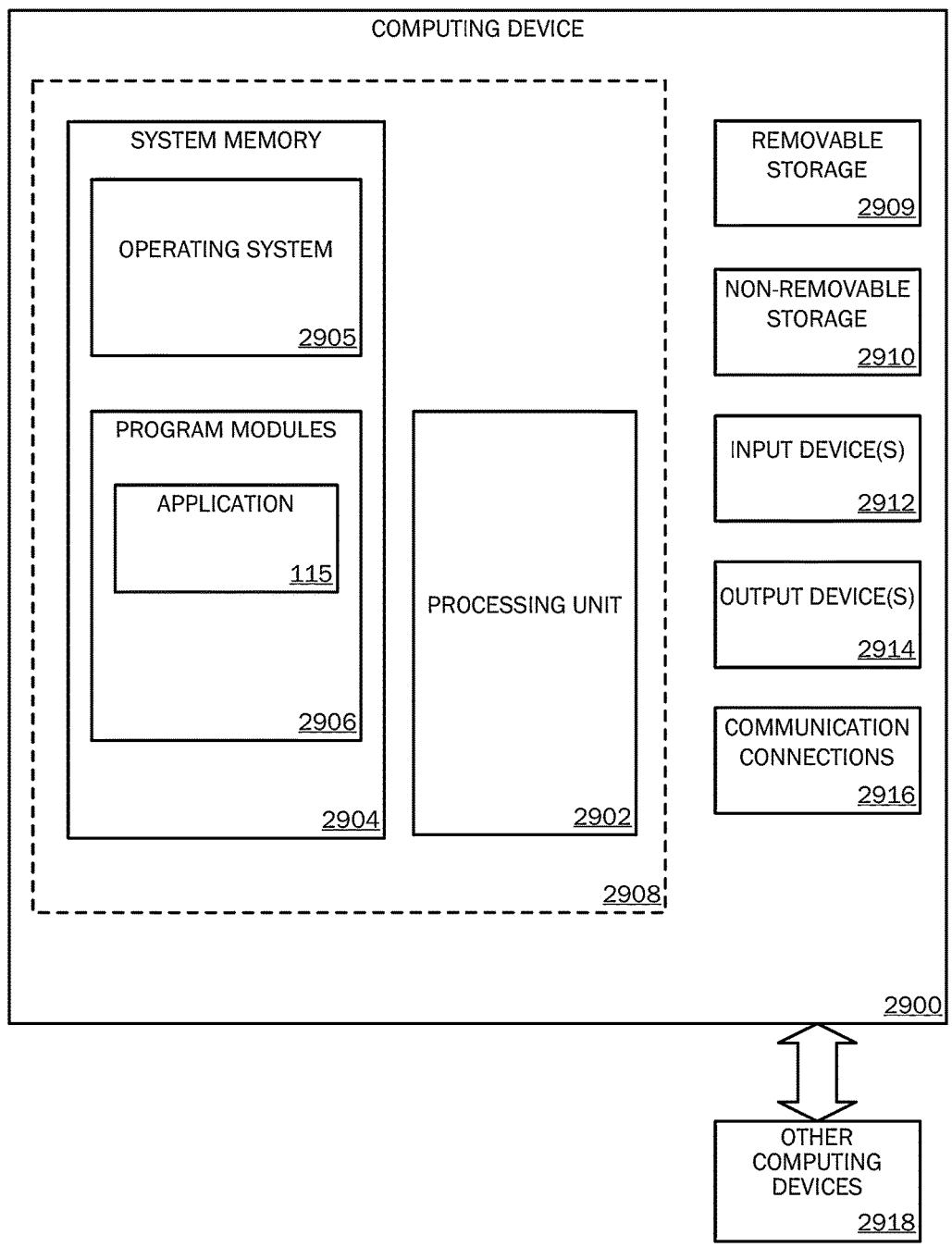
FIG. 29 is a block diagram illustrating example physical components of a computing device with which embodiments of the invention may be practiced.
Figure 30A:
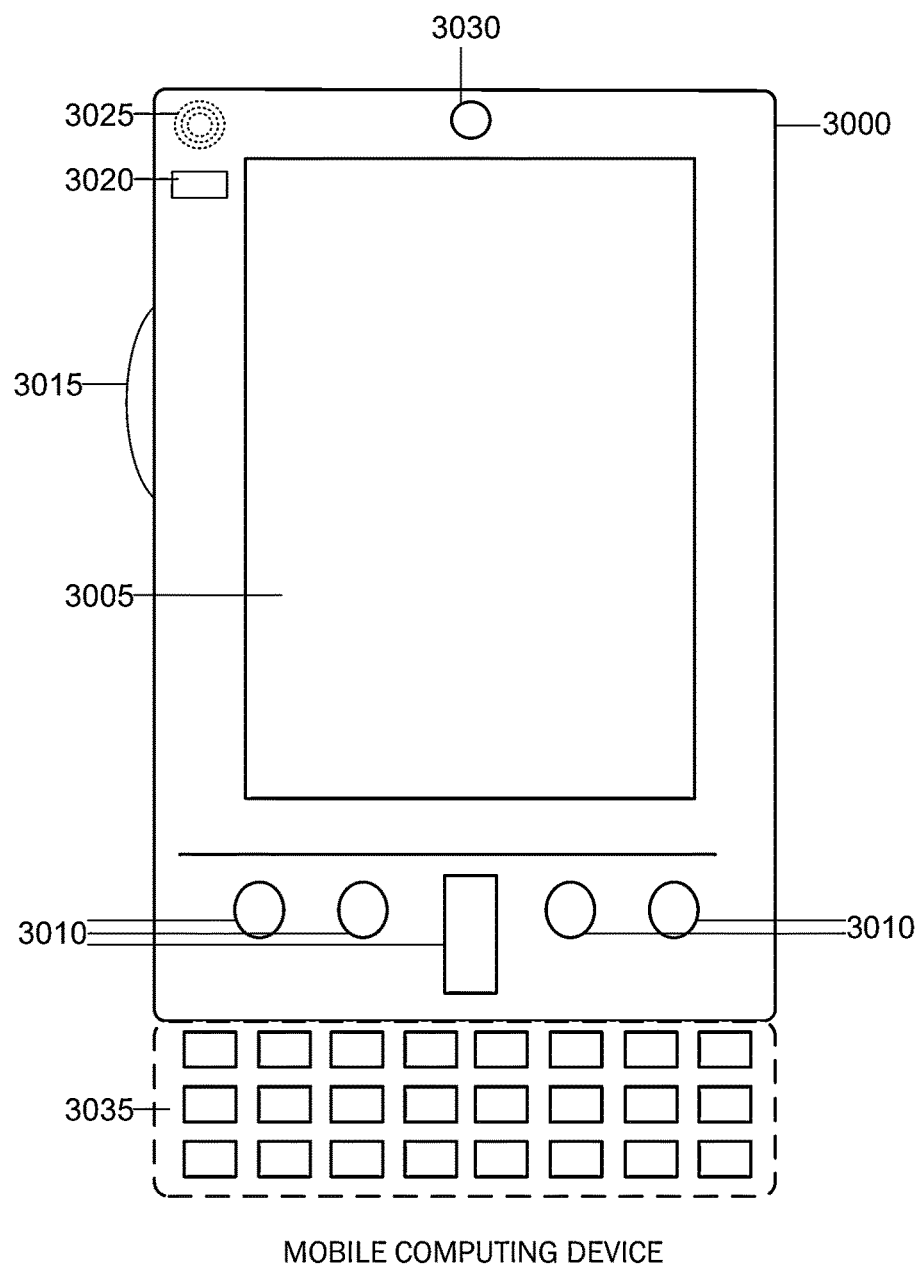
FIGS. 30A and 30B are simplified block diagrams of a mobile computing device with which embodiments of the present invention may be practiced.
Figure 30B:
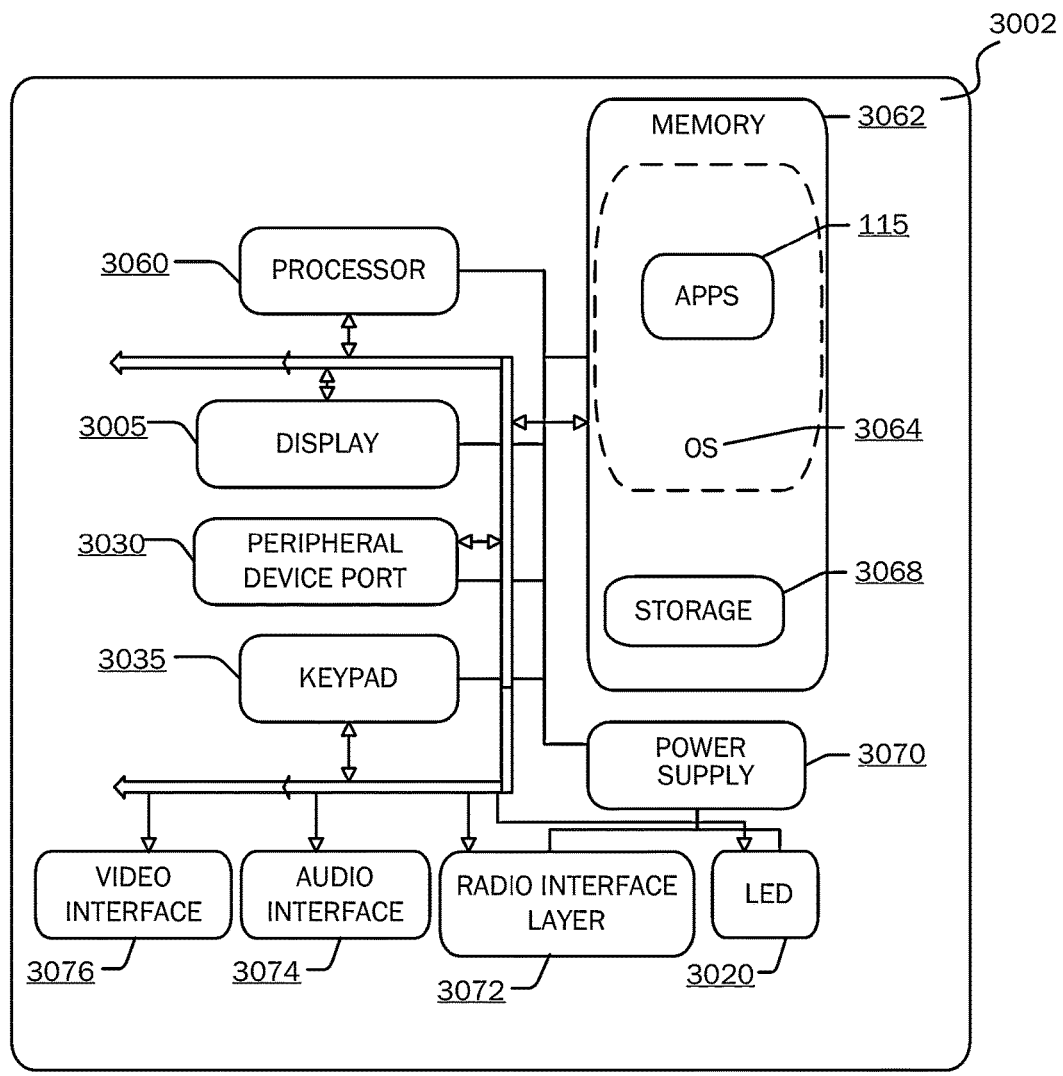
Figure 31:
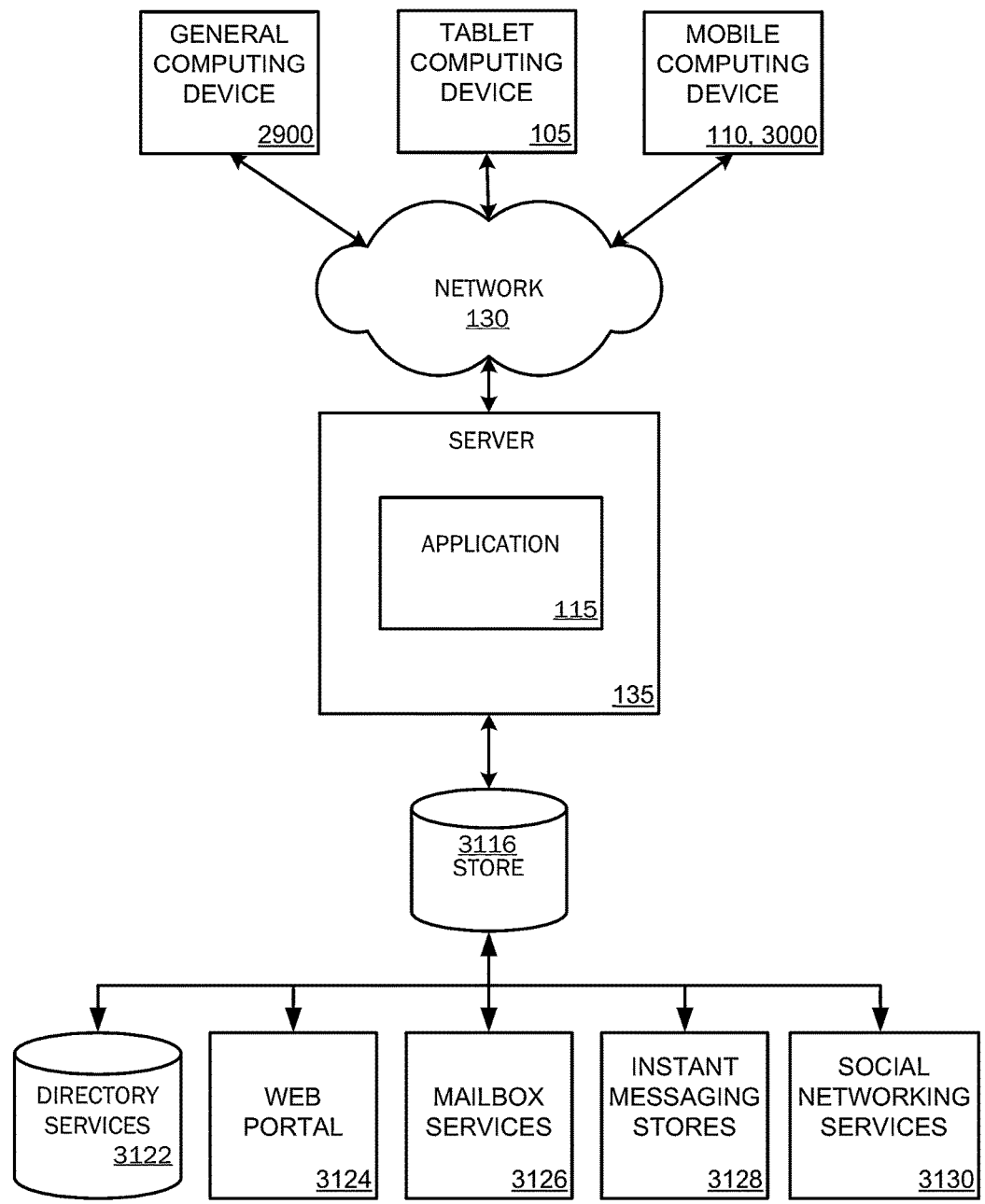
FIG. 31 is a simplified block diagram of a distributed computing system in which embodiments of the present invention may be practiced.

FIGS. 29-31 and the associated descriptions provide a discussion of a variety of operating environments in which embodiments of the invention may be practiced. However, the devices and systems illustrated and discussed with respect to FIGS. 29-31 are for purposes of example and illustration and are not limiting of a vast number of computing device configurations that may be utilized for practicing embodiments of the invention, described herein.

FIG. 29 is a block diagram illustrating physical components (i.e., hardware) of a computing device 2900 with which embodiments of the invention may be practiced. The computing device components described below may be suitable for the computing devices 105, 110, 120, 125, 135 described above. In a basic configuration, the computing device 2900 may include at least one processing unit 2902 and a system memory 2904. Depending on the configuration and type of computing device, the system memory 2904 may comprise, but is not limited to, volatile storage (e.g., random access memory), non-volatile storage (e.g., read-only memory), flash memory, or any combination of such memories. The system memory 2904 may include an operating system 2905 and one or more program modules 2906 suitable for running a variety of applications 2920. The operating system 2905, for example, may be suitable for controlling the operation of the computing device 2900. Furthermore, embodiments of the invention may be practiced in conjunction with a graphics library, other operating systems, or any other application program and is not limited to any particular application or system. This basic configuration is illustrated in FIG. 29 by those components within a dashed line 2908. The computing device 2900 may have additional features or functionality. For example, the computing device 2900 may also include additional data storage devices (removable and/or non-removable) such as, for example, magnetic disks, optical disks, or tape. Such additional storage is illustrated in FIG. 29 by a removable storage device 2909 and a non-removable storage device 2910.

As stated above, a number of program modules and data files may be stored in the system memory 2904. While executing on the processing unit 2902, the program modules 2906 may perform processes including, but not limited to, one or more of the stages of the method 2800 illustrated in FIG. 28. Other program modules that may be used in accordance with embodiments of the present invention may include applications, such as, notes applications, Internet browser applications, electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 29 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to use of web page content may be operated via application-specific logic integrated with other components of the computing device 2900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 2900 may also have one or more input device(s) 2912 such as a keyboard, a mouse, a pen, a sound input device, a touch input device, etc. The output device(s) 2914 such as a display, speakers, a printer, etc. may also be included. The aforementioned devices are examples and others may be used. The computing device 2900 may include one or more communication connections 2916 allowing communications with other computing devices 2918. Examples of suitable communication connections 2916 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 2904, the removable storage device 2909, and the non-removable storage device 2910 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2900. Any such computer storage media may be part of the computing device 2900.

FIGS. 30A and 30B illustrate a mobile computing device 3000, for example, a mobile telephone, a smart phone 110, a tablet-style personal computer 105, a laptop computer, and the like, with which embodiments of the invention may be practiced. With reference to FIG. 30A, one embodiment of a mobile computing device 3000 for implementing the embodiments is illustrated. In a basic configuration, the mobile computing device 3000 is a handheld computer having both input elements and output elements. The mobile computing device 3000 typically includes a display 3005 and one or more input buttons 3010 that allow the user to enter information into the mobile computing device 3000. The display 3005 of the mobile computing device 3000 may also function as an input device (e.g., a touch screen display). If included, an optional side input element 3015 allows further user input. The side input element 3015 may be a rotary switch, a button, or any other type of manual input element. In alternative embodiments, mobile computing device 3000 may incorporate more or less input elements. For example, the display 3005 may not be a touch screen in some embodiments. In yet another alternative embodiment, the mobile computing device 3000 is a portable phone system, such as a cellular phone. The mobile computing device 3000 may also include an optional keypad 3035. Optional keypad 3035 may be a physical keypad or a "soft" keypad generated on the touch screen display. In various embodiments, the output elements include the display 3005 for showing a graphical user interface (GUI), a visual indicator 3020 (e.g., a light emitting diode), and/or an audio transducer 3025 (e.g., a speaker). In some embodiments, the mobile computing device 3000 incorporates a vibration transducer for providing the user with tactile feedback. In yet another embodiment, the mobile computing device 3000 incorporates input and/or output ports, such as an audio input (e.g., a microphone jack), an audio output (e.g., a headphone jack), and a video output (e.g., a HDMI port) for sending signals to or receiving signals from an external device.

FIG. 30B is a block diagram illustrating the architecture of one embodiment of a mobile computing device. That is, the mobile computing device 3000 can incorporate a system (i.e., an architecture) 3002 to implement some embodiments. In one embodiment, the system 3002 is implemented as a "smart phone" capable of running one or more applications (e.g., browser, e-mail, calendaring, contact managers, messaging clients, games, and media clients/players). In some embodiments, the system 3002 is integrated as a computing device, such as an integrated personal digital assistant (PDA) and wireless phone.

One or more application programs may be loaded into the memory 3062 and run on or in association with the operating system 3064. Examples of the application programs include phone dialer applications, e-mail applications, personal information management (PIM) applications, word processing applications, spreadsheet applications, Internet browser applications, notes applications, messaging applications, and so forth. The system 3002 also includes a non-volatile storage area 3068 within the memory 3062. The non-volatile storage area 3068 may be used to store persistent information that should not be lost if the system 3002 is powered down. The application programs may use and store information in the non-volatile storage area 3068, such as e-mail or other messages used by an e-mail application, and the like. A synchronization application (not shown) also resides on the system 3002 and is programmed to interact with a corresponding synchronization application resident on a host computer to keep the information stored in the non-volatile storage area 3068 synchronized with corresponding information stored at the host computer. As should be appreciated, other applications may be loaded into the memory 3062 and run on the mobile computing device 3000.

The system 3002 has a power supply 3070, which may be implemented as one or more batteries. The power supply 3070 might further include an external power source, such as an AC adapter or a powered docking cradle that supplements or recharges the batteries.

The system 3002 may also include a radio 3072 that performs the function of transmitting and receiving radio frequency communications. The radio 3072 facilitates wireless connectivity between the system 3002 and the "outside world," via a communications carrier or service provider. Transmissions to and from the radio 3072 are conducted under control of the operating system 3064. In other words, communications received by the radio 3072 may be disseminated to the application programs 120 via the operating system 3064, and vice versa.

The visual indicator 3020 may be used to provide visual notifications and/or an audio interface 3074 may be used for producing audible notifications via the audio transducer 3025. In the illustrated embodiment, the visual indicator 3020 is a light emitting diode (LED) and the audio transducer 3025 is a speaker. These devices may be directly coupled to the power supply 3070 so that when activated, they remain on for a duration dictated by the notification mechanism even though the processor 3060 and other components might shut down for conserving battery power. The LED may be programmed to remain on indefinitely until the user takes action to indicate the powered-on status of the device. The audio interface 3074 is used to provide audible signals to and receive audible signals from the user. For example, in addition to being coupled to the audio transducer 3025, the audio interface 3074 may also be coupled to a microphone to receive audible input, such as to facilitate a telephone conversation. In accordance with embodiments of the present invention, the microphone may also serve as an audio sensor to facilitate control of notifications, as will be described below. The system 3002 may further include a video interface 3076 that enables an operation of an on-board camera 3030 to record still images, video stream, and the like.

A mobile computing device 3000 implementing the system 3002 may have additional features or functionality. For example, the mobile computing device 3000 may also include additional data storage devices (removable and/or non-removable) such as, magnetic disks, optical disks, or tape. Such additional storage is illustrated in FIG. 30B by the non-volatile storage area 3068.

Data/information generated or captured by the mobile computing device 3000 and stored via the system 3002 may be stored locally on the mobile computing device 3000, as described above, or the data may be stored on any number of storage media that may be accessed by the device via the radio 3072 or via a wired connection between the mobile computing device 3000 and a separate computing device associated with the mobile computing device 3000, for example, a server computer in a distributed computing network, such as the Internet. As should be appreciated such data/information may be accessed via the mobile computing device 3000 via the radio 3072 or via a distributed computing network. Similarly, such data/information may be readily transferred between computing devices for storage and use according to well-known data/information transfer and storage means, including electronic mail and collaborative data/information sharing systems.

FIG. 31 illustrates one embodiment of the architecture of a system for providing simplified data and function input, as described above. Content developed, interacted with, or edited in association with embodiments of the invention may be stored in different communication channels or other storage types. For example, various documents and stored content items may be stored using a directory service 3122, a web portal 3124, a mailbox service 3126, an instant messaging store 3128, or a social networking site 3130. The simplified data and function input functionality described herein may use any of these types of systems or the like for enabling data utilization, as described herein. A server 135 may provide output of the simplified data and function input functionality to clients. As one example, the server 135 may be a web server providing the simplified data and function input functionality over the web. The server 135 may provide the output of the simplified data and function input functionality over the web to clients through a network 130. By way of example, the client computing device may be implemented and embodied in a personal computer 2900, a tablet computing device 105 and/or a mobile computing device (e.g., a smart phone) 110, or other computing device. Any of these embodiments of the client computing device may obtain content from the store 3116.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method for simplifying data input in an electronic spreadsheet document of a spreadsheet application, comprising:
  displaying an electronic spreadsheet document of a spreadsheet application on a computer-implemented touch-input display surface of a small form computing device, wherein the electronic spreadsheet document includes a plurality of cells;
  receiving a selection of one or more of the plurality of cells of of the electronic spreadsheet document, wherein at least one of the selected cells has an established data type;
  in response to receiving the selection of one or more of the plurality of cells, determining from a plurality of floating user interface components at least one floating user interface component to display based on the established data type and displaying the at least one floating user interface component on the displayed electronic spreadsheet document,
  wherein a display of each of the plurality of floating user interface components comprises a standardized frame portion and a changeable interface element, the changeable interface element changing according to the established data type within the selection, wherein the standardized frame includes a first set of a plurality of arithmetic functions that remain consistent regardless of the display of the changeable interface element, and
  wherein the changeable interface element is changeable between a numerical interface, an alphabetical interface and an arithmetical function interface, the arithmetical function interface including a second set of a plurality of arithmetic functions;
  receiving a selection of one of the plurality of arithmetic functions from the first or second set of arithmetic functions available in the at least one floating user interface component; and
  applying the selected arithmetic function to at least one of the cells in the selection.

2. The method of claim 1, wherein the changeable interface element is additionally changeable to an ink-input scratchpad that receives an electronic inking input.

3. The method of claim 2, further comprising interpreting the received electronic inking input as an arithmetic function and providing feedback for the interpreted electronic inking input.

4. The method of claim 3, wherein if the received electronic inking input is not interpreted as associated with a single available arithmetic function, interpreting the received electronic inking input as two or more available arithmetic functions, and offering the two or more available arithmetic functions for selection for application to the at least one of the cells in the selection.

5. The method of claim 2, after receiving an electronic inking input in the floating user interface component, further comprising interpreting the received electronic inking input as an available applicable arithmetic function of the spreadsheet application.

6. The method of claim 3, wherein interpreting the received electronic inking input includes translating the interpreted electronic inking input into a syntax associated with an available arithmetic function of the spreadsheet application.

7. The method of claim 1, wherein if receiving either the selection of the one or more of the plurality of cells in the electronic spreadsheet or the selection of the one of the plurality of arithmetic functions from the first or second set of arithmetic functions are ambiguous selections such that one or both of the selections may not be interpreted, providing a disambiguation user interface component for allowing a corrected selection.

8. The method of claim 1, further comprising providing a tool tip in association with the displayed electronic spreadsheet document for providing information about the application of the selected arithmetic function in relation to the at least one cell in the selection.

9. A method of simplifying data input in an electronic spreadsheet document of a spreadsheet application, comprising:
  receiving an electronic spreadsheet document on a computer-implemented touch-input display surface of a small form computing device, the electronic spreadsheet document having a plurality of cells;
  receiving a selection of one or more of the plurality of cells of the electronic spreadsheet document, wherein at least one of the selected cells has an established data type;
    determining from a plurality of floating user interface components, at least one floating user interface component to display based on the established data type,
  wherein a display of each of the plurality of floating user interface components comprises a standardized frame portion and a changeable interface element, the changeable interface element changing according to the established data type within the selection, wherein the standardized frame includes a first set of a plurality of arithmetic functions that remain consistent regardless of the display of the changeable interface element, and
  wherein the changeable interface element is changeable between an electronic scratch pad and an arithmetical function interface that includes a second set of a plurality of arithmetic functions;
  receiving an electronic inking input on the electronic scratch pad associated with an available arithmetic function that may be applied to at least one cell in the selection;
  interpreting the electronic inking item as an available arithmetic function that may be applied to the at least one cell in the selection; and
  receiving a selection in the floating user interface to apply the available arithmetic function to the at least one cell in the selection, applying the available arithmetic function to the at least one cell in the selection and displaying the result of the application of the arithmetic function to the at least one cell in the selection in the electronic spreadsheet document.

10. A method of simplifying data input in an electronic spreadsheet document of a spreadsheet application, comprising
  displaying an electronic spreadsheet document on a computer-implemented touch-input display surface of a small form computing device, the electronic spreadsheet document having a plurality of cells;

receiving a selection of one or more of the plurality of cells within the electronic spreadsheet document, wherein at least one of the selected cells has an established data type;

determining from a plurality of floating user interface elements at least one user interface element to display based on the data type wherein a display of each of the plurality of floating user interface components comprises a standardized frame portion and a changeable interface element, the changeable interface element changing according to the established data type within the selection, wherein the standardized frame includes a first set of a plurality of arithmetic functions that remain consistent regardless of the display of the changeable interface element, and wherein the changeable interface element is changeable between a numerical interface, an alphabetical interface and an arithmetical function interface, the arithmetical function interface including a second set of a plurality of arithmetic functions;

displaying the at least one floating user interface element;

receiving a selection of one of the plurality of arithmetic functions from the first or second set of arithmetic functions available in the at least one floating user interface element;

displaying a preview of an application of the selected arithmetic function in relation to at least one of the cells in the selection of the one or more of the plurality of cells;

receiving another selection to then reject or apply the selected arithmetic function to the at least one of the cells based on the preview; and when the selection to apply the selected arithmetic function is received, applying the arithmetic function and displaying in the electronic spreadsheet document the result of the application of the selected arithmetic function.

11. The method of claim 10, wherein when the selection to reject the selected arithmetic function is received, removing the preview from the at least one floating user interface.

12. The method of claim 10, wherein applying the selected arithmetic function is in response to a gesture received in the electronic spreadsheet document.

13. The method of claim 12, wherein when the received gesture is an ambiguous gesture that cannot be interpreted, providing a disambiguation user interface component for allowing a corrected gesture input.

14. The method of claim 1, wherein the at least one floating user interface component is user-configurable.

15. The method claim 1, wherein the displayed at least one floating user interface component is allowed to move relative to the selection of the one or more of the plurality of cells.

* * * * *